(12) United States Patent
Furlotti

(10) Patent No.: US 11,446,856 B2
(45) Date of Patent: Sep. 20, 2022

(54) ASSEMBLY FOR MANUFACTURING FILLABLE CONTAINERS AND A PACKAGING LINE COMPRISING SUCH MANUFACTURING ASSEMBLY AND A CORRESPONDING METHOD

(71) Applicant: I.M.A. INDUSTRIA MACCHINE AUTOMATICHE S.P.A IN SIGLA IMA S.P.A., Ozzano dell'Emilia (IT)

(72) Inventor: Filippo Furlotti, Traversetolo (IT)

(73) Assignee: I.M.A. INDUSTRIA MACCHINE AUTOMATICHE S.P.A IN SIGLA IMA S.P.A., Ozzano dell'Emilia (IT)

( * ) Notice: Subject to any disclaimer, the term of this patent is extended or adjusted under 35 U.S.C. 154(b) by 518 days.

(21) Appl. No.: 16/481,691

(22) PCT Filed: Feb. 8, 2018

(86) PCT No.: PCT/EP2018/053208
§ 371 (c)(1),
(2) Date: Jul. 29, 2019

(87) PCT Pub. No.: WO2018/146211
PCT Pub. Date: Aug. 16, 2018

(65) Prior Publication Data
US 2019/0381718 A1 Dec. 19, 2019

(30) Foreign Application Priority Data
Feb. 10, 2017 (IT) .......................... 102017000014643

(51) Int. Cl.
*B29C 51/26* (2006.01)
*B29C 51/22* (2006.01)
(Continued)

(52) U.S. Cl.
CPC ............ *B29C 51/261* (2013.01); *B29C 51/22* (2013.01); *B29C 51/425* (2013.01); *B29C 51/46* (2013.01);
(Continued)

(58) Field of Classification Search
CPC ........... B65B 1/02; B65B 3/022; B65B 43/08; B65B 47/02; B65B 47/04; B65B 65/003;
(Continued)

(56) References Cited

U.S. PATENT DOCUMENTS 3,570,647 A * 3/1971 Meikle ................. B21D 43/006
198/470.1
3,596,322 A * 8/1971 Swezey ..................... B65B 1/02
425/436 R
(Continued)

FOREIGN PATENT DOCUMENTS

CN 102639313 A 8/2012
DE 1105336 B * 4/1961 ............... B65B 1/02
(Continued)

OTHER PUBLICATIONS

International Search Report dated Mar. 8, 2018 re: Application No. PCT/EP2018/053208, pp. 1-3, citing: WO 01/81069 A1, EP 1 841 602 B1, US 3 964 237 A, and US 4 208 955 A.
(Continued)

*Primary Examiner* — Stephen F. Gerrity
(74) *Attorney, Agent, or Firm* — Cantor Colburn LLP

(57) ABSTRACT

An assembly for manufacturing containers by thermoforming, which includes a magazine of thermoplastic sheet-like blanks, a feeding station for feeding the blanks, a heating station for heating the blanks, and a station for thermoforming containers starting from the blanks. The feeding station includes a closed-loop path and at least two conveyor elements, which move, following each other, along the path
(Continued)

between a loading position, in which the conveyor element faces the blank magazine, and an unloading position, in which the conveyor element faces the heating station. The heating station includes a heating carousel, wherein, in the active condition, the conveyor element in the unloading position moves with a substantially linear motion with a speed that is substantially equal to a peripheral speed of the heating carousel.

10 Claims, 23 Drawing Sheets

(51) Int. Cl.
    B29C 51/42      (2006.01)
    B29C 51/46      (2006.01)
    B65B 1/02       (2006.01)
    B65B 43/08      (2006.01)
    B65B 65/00      (2006.01)
    B65B 47/02      (2006.01)
    B65B 47/04      (2006.01)
    B29K 101/12     (2006.01)
    B29L 31/00      (2006.01)
    B65B 3/02       (2006.01)

(52) U.S. Cl.
    CPC ............... *B65B 1/02* (2013.01); *B65B 3/022* (2013.01); *B65B 43/08* (2013.01); *B65B 47/02* (2013.01); *B65B 47/04* (2013.01); *B65B 65/003* (2013.01); *B29K 2101/12* (2013.01); *B29L 2031/712* (2013.01)

(58) Field of Classification Search
    CPC ......... B29C 51/04; B29C 51/20; B29C 51/22; B29C 51/261; B29C 51/262; B29C 51/264; B29C 51/421; B29C 51/422; B29C 51/425; B29C 51/426; B29C 51/46
    USPC .......................................... 53/141, 453, 559
    See application file for complete search history.

(56) References Cited

U.S. PATENT DOCUMENTS

| | | | | |
|---|---|---|---|---|
| 3,605,381 A | * | 9/1971 | Yoshikawa et al. | B67C 7/0006 198/441 |
| 3,661,489 A | * | 5/1972 | Moore | B29C 51/421 425/395 |
| 3,964,237 A | | 6/1976 | Johansen | |
| 4,048,781 A | * | 9/1977 | Johansen | B65B 47/04 264/522 |
| 4,208,955 A | | 6/1980 | Doll et al. | |
| 5,054,271 A | * | 10/1991 | DeWoskin | B29C 65/7879 53/574 |
| 6,094,890 A | * | 8/2000 | Michellon et al. | B29C 51/261 53/453 |
| 6,499,280 B1 | | 12/2002 | Tsutsui | |
| 6,976,836 B2 | * | 12/2005 | Suzuki | B29C 49/4205 425/537 |
| 10,144,545 B2 | * | 12/2018 | Bianchi et al. | B65G 47/06 |

FOREIGN PATENT DOCUMENTS

| | | | | |
|---|---|---|---|---|
| DE | 1212288 B | * | 3/1966 | ........... B29C 51/262 |
| DE | 1454948 A1 | * | 4/1969 | ........... B29C 51/261 |
| DE | 2547814 A1 | * | 4/1977 | ........... B29C 51/22 |
| DE | 4113568 C1 | * | 5/1992 | ........... B29C 51/261 |
| EP | 1841602 B1 | | 1/2012 | |
| WO | 0181069 A1 | | 11/2001 | |
| WO | 2006095120 A1 | | 9/2006 | |
| WO | WO-2016128680 A1 | * | 8/2016 | ........... B65G 47/901 |

OTHER PUBLICATIONS

IT Search Report dated Oct. 5, 2017 re: Application No. IT 2017000014643, pp. 1-8, citing: WO 01/81069 A1, EP 1 841 602 B1, US 3 964 237 A, and US 4 208 955 A.

Written Opinion dated Mar. 8, 2018 re: Application No. PCT/EP2018/053208, pp. 1-7, citing: WO 01/81069 A1, EP 1 841 602 B1, US 3 964 237 A, and US 4 208 955 A.

* cited by examiner

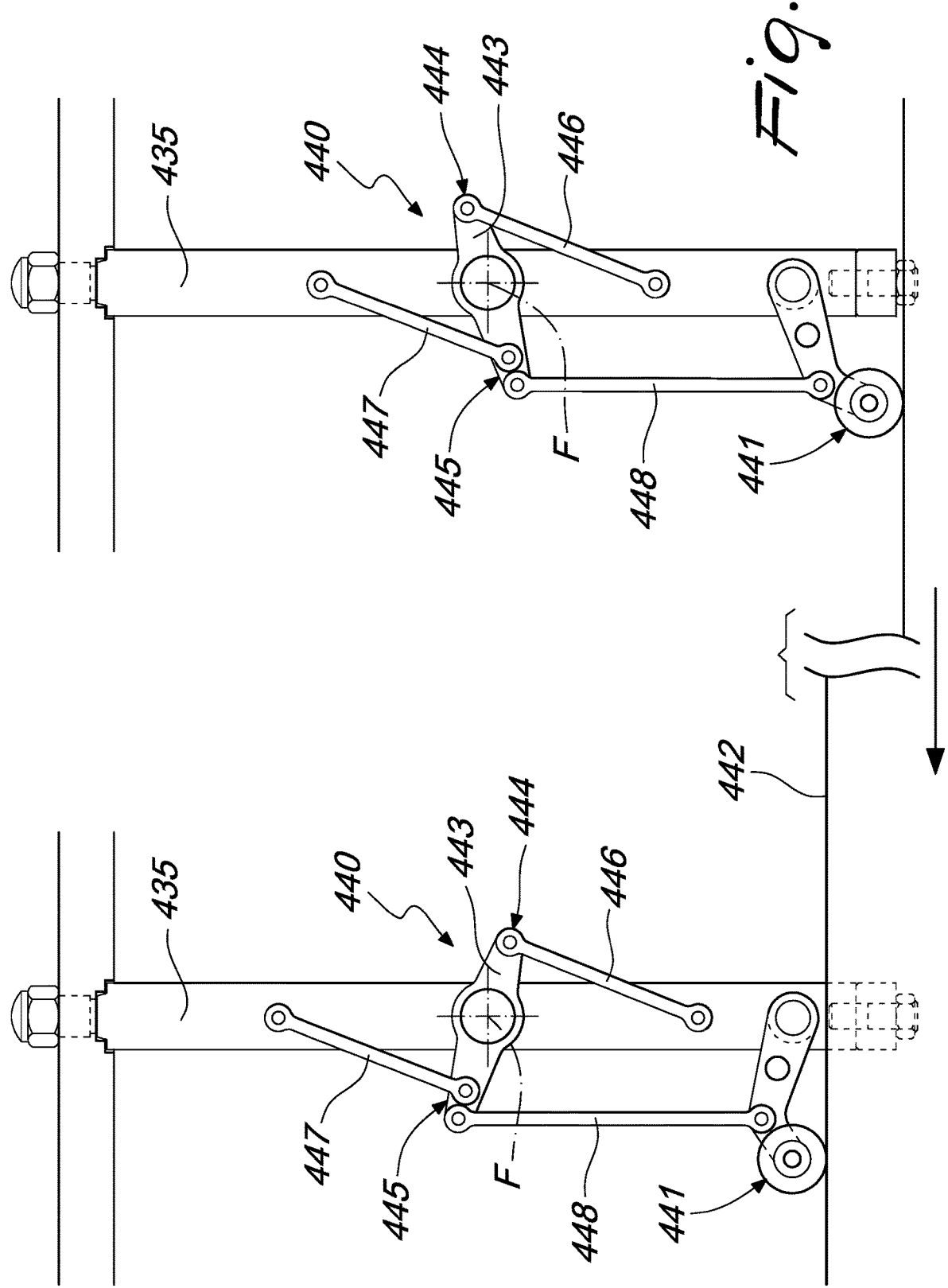

ASSEMBLY FOR MANUFACTURING FILLABLE CONTAINERS AND A PACKAGING LINE COMPRISING SUCH MANUFACTURING ASSEMBLY AND A CORRESPONDING METHOD

TECHNICAL FIELD

The present disclosure relates to an assembly for manufacturing fillable containers, a packaging line that comprises such assembly, particularly an FFS (form-fill-seal) packaging line, and a method of manufacturing containers by thermoforming.

BACKGROUND

FFS lines are used especially in the food sector, when it is necessary to manufacture a container by thermoforming starting from a blank and to fill it with a loose product, such as for example a liquid or semi-liquid food (e.g. yogurts, soft cheeses and the like) or a powdered food.

Known solutions are based on linear machines, such as for example the one described in U.S. Pat. No. 6,094,890. These solutions however have a series of limitations that are associated precisely with deployment in a production line. One of these limitations, for example, is an extremely low flexibility owing to the fact that the machine spacing is linked to the diameter of the containers, so that, when it becomes necessary to modify the latter, the machine has to be subjected to extensive modifications, which affect especially the overall length of the machine, with the consequence that a machine designed to work on containers that have a certain diameter cannot work on containers with a larger diameter, except at the expense of adaptations that are entirely uneconomical or incompatible with the space originally allocated to the machine.

Another known solution is proposed in the U.S. Pat. No. 3,964,237, which teaches providing a machine of the above mentioned type provided with a wheel or carousel on which all the processes (thermoforming, filling and closing of the containers) take place at fixed processing stations arranged along consecutive arcs around the carousel.

Although useful, this known solution exhibits a problem which is linked to low productivity (in terms of units of containers produced per unit of time), which is mainly due to the fact that it has a discontinuous or intermittent motion, wherein advancement steps are followed by arrest steps for processing.

In the machine in U.S. Pat. No. 3,964,237, in fact, the carousel has to stop at each station in order to allow the loading of disks, the thermoforming, the filling, and the sealing.

Furthermore, the system for loading the disk blanks, implemented by simply dropping them from a vertical magazine, is relatively prone to jamming.

SUMMARY

The aim of the present disclosure includes providing a line for packaging, by using thermoforming, containers which can be filled with loose material, which line is capable of improving the prior art in one or more of the above mentioned aspects.

Within this aim, the present disclosure provides a line that makes it possible to increase productivity.

The disclosure relates to providing a line that is provided with high speed loading and processing stations that are not prone to malfunctions.

The disclosure enables the format of the containers to be made to be changed without modifying the machine pitch.

Furthermore, the present disclosure overcomes the drawbacks of the prior art in a different manner to any existing solutions.

Still further, the disclosure provides a line that is highly reliable, easy to implement and low cost.

This aim and these and other advantages which will become better apparent hereinafter are achieved by providing an assembly for manufacturing containers by thermoforming, which comprises a magazine of thermoplastic sheet-like blanks, a station for feeding the blanks, a station for heating the blanks, a station for thermoforming containers starting from said blanks, characterized in that the feeding station comprises a closed-loop path and at least two conveyor elements which move, following each other, along said path between a loading position, in which the conveyor element faces the blank magazine, and an unloading position, in which the conveyor element faces the heating station; and wherein the heating station comprises a heating carousel on which a plurality of heating heads is provided; wherein, in the active condition, the conveyor element in the unloading position moves with a substantially linear motion with a speed that is substantially equal to a peripheral speed of the heating carousel.

The aim and advantages are also achieved by providing an assembly for manufacturing containers by thermoforming, which comprises a magazine of thermoplastic sheet-like blanks, a station for feeding the blanks, a station for heating the blanks, a station for thermoforming containers starting from said blanks, characterized in that the feeding station comprises a centrifugal force selector. In this case, the feeding station may further comprise a loose blank magazine upstream of the centrifugal force selector and a feeding star conveyor downstream of the centrifugal force selector, the feeding star conveyor being adapted to feed a heating carousel.

The aim and advantages are also achieved by providing a packaging line that comprises the above mentioned manufacturing assembly, a station for filling the containers with loose material and a station for sealing the filled containers. The thermoforming station, the filling station and the sealing station can comprise respective carousels, on the peripheral region of which there are thermoforming heads, filling heads and sealing heads, respectively. Furthermore, the packaging line can comprise a first, second and third transfer star conveyor, wherein the first transfer star conveyor is interposed between the heating station and the thermoforming station, the second transfer star conveyor is interposed between the thermoforming station and the filling station, and the third transfer star conveyor is interposed between the filling station and the sealing station.

The aim and advantages are also achieved by providing a method of manufacturing containers by thermoforming, which includes the following steps:

a. taking at least one sheet-like blank from a magazine in which multiple blanks are aligned, preferably stacked and stationary;

b. accelerating said at least one blank to a linear speed that is substantially equal to and concordant with a peripheral speed of a carousel of a heating station;

c. transferring said at least one blank to heating heads which are mounted on the carousel of the heating station or to an intermediate transfer star conveyor, which then releases it to the carousel of the heating station;

d. heating said at least one blank;

e. transferring said at least one heated blank to a thermoforming station for the manufacture of said containers.

BRIEF DESCRIPTION OF THE DRAWINGS

Further characteristics and advantages of the disclosure will become better apparent from the detailed description of a preferred, but not exclusive, embodiment of an assembly and a line according to the disclosure, which are illustrated by way of non-limiting example with the aid of the accompanying drawings wherein:

FIG. 14A is a side view of part of the heating head of the station of the previous figure;

DETAILED DESCRIPTION OF THE DRAWINGS

Figure 1:
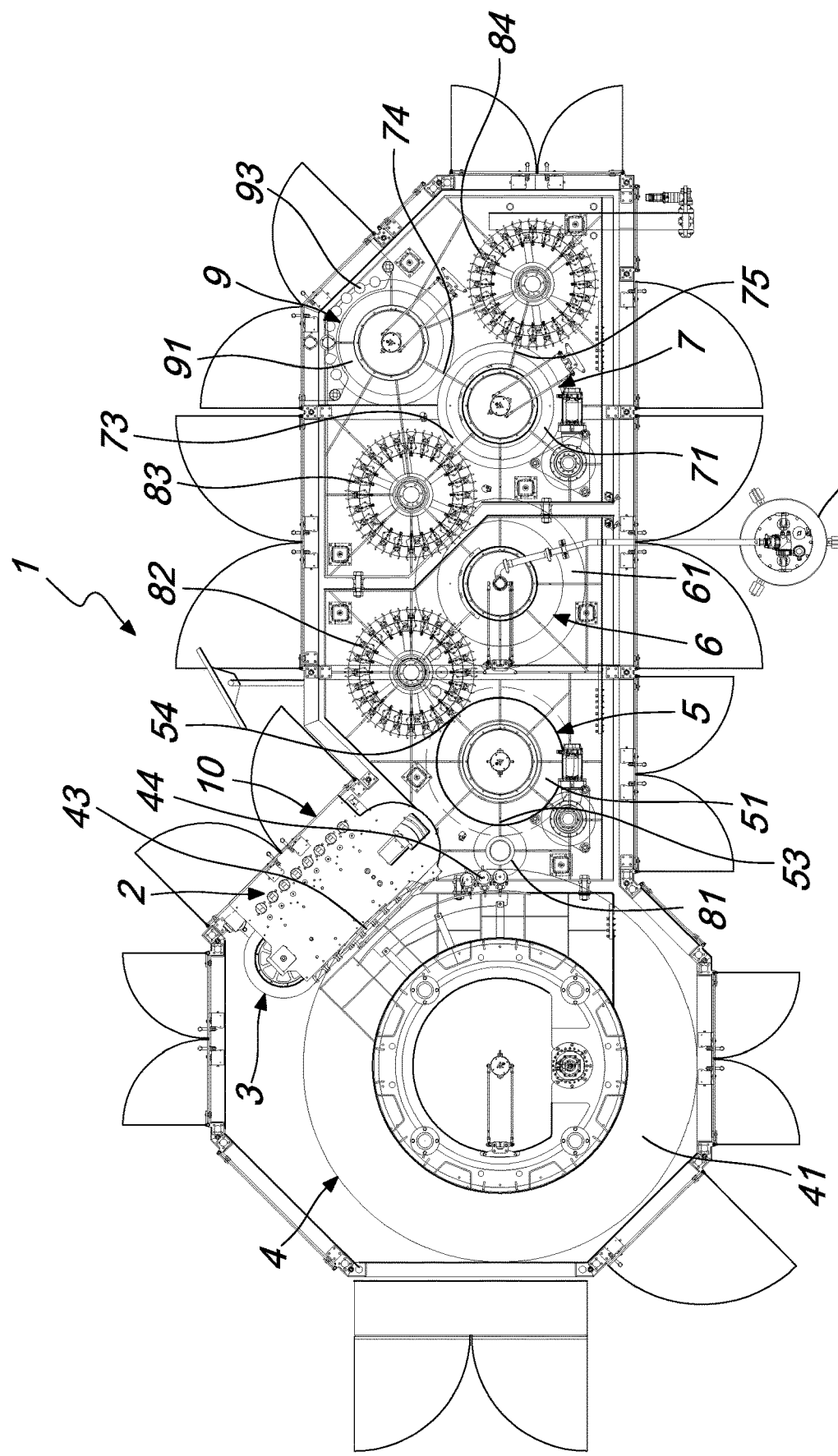
FIG. 1 is a plan view from above of an embodiment of an FFS packaging line according to the disclosure.
Figure 2:
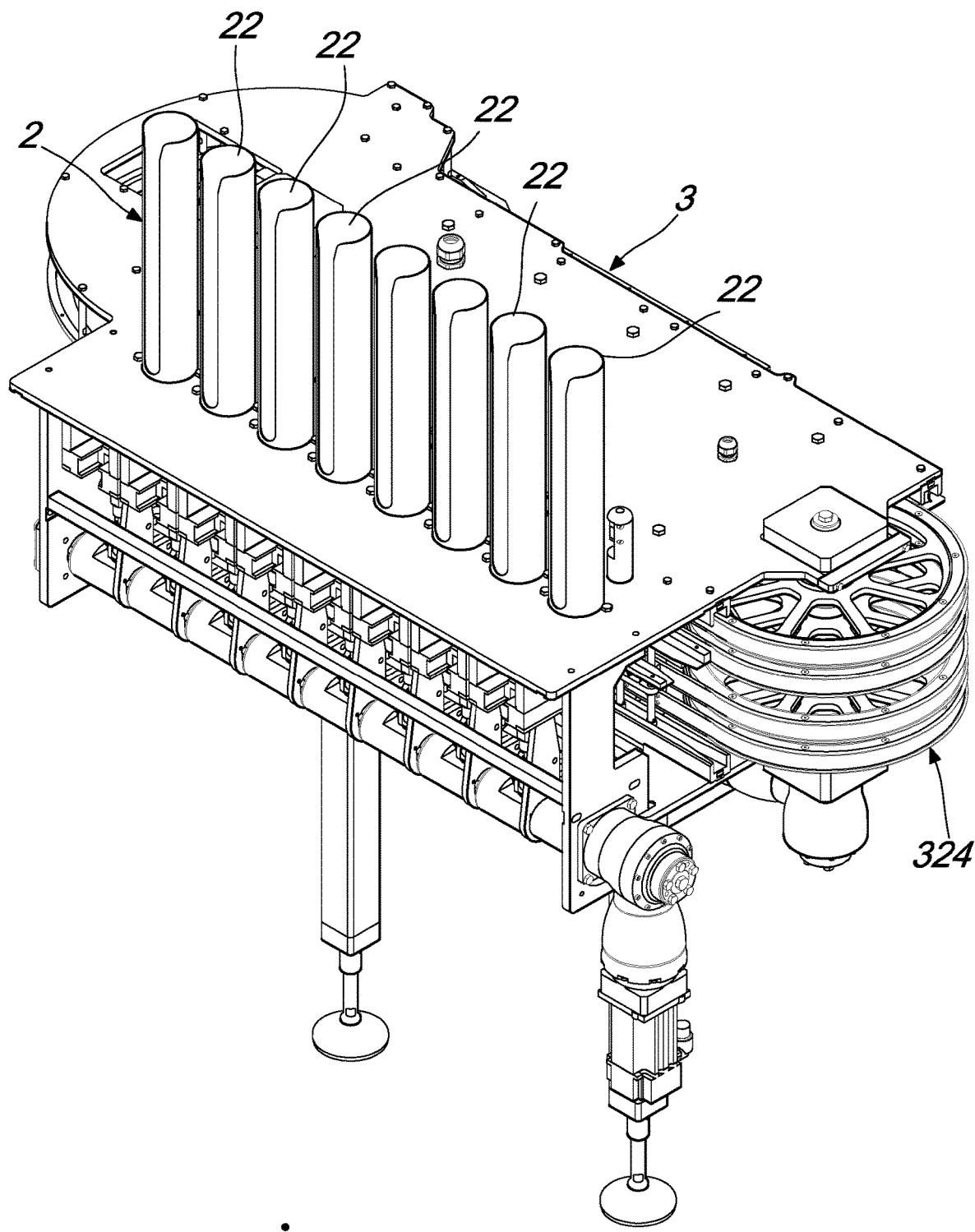
FIGS. 2 and 3 are perspective views of two stations of the line of the previous figure.
Figure 3:
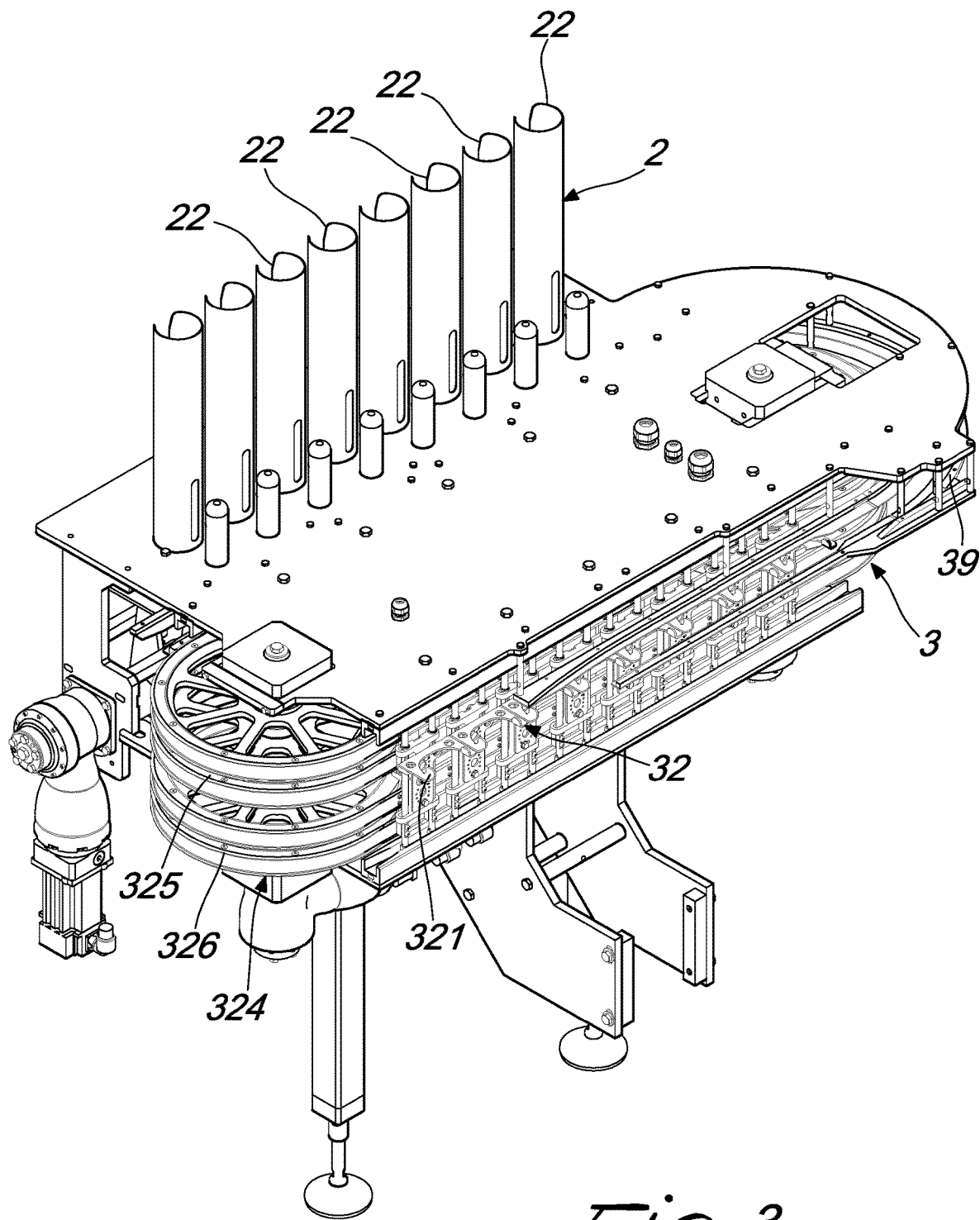
Figure 4:
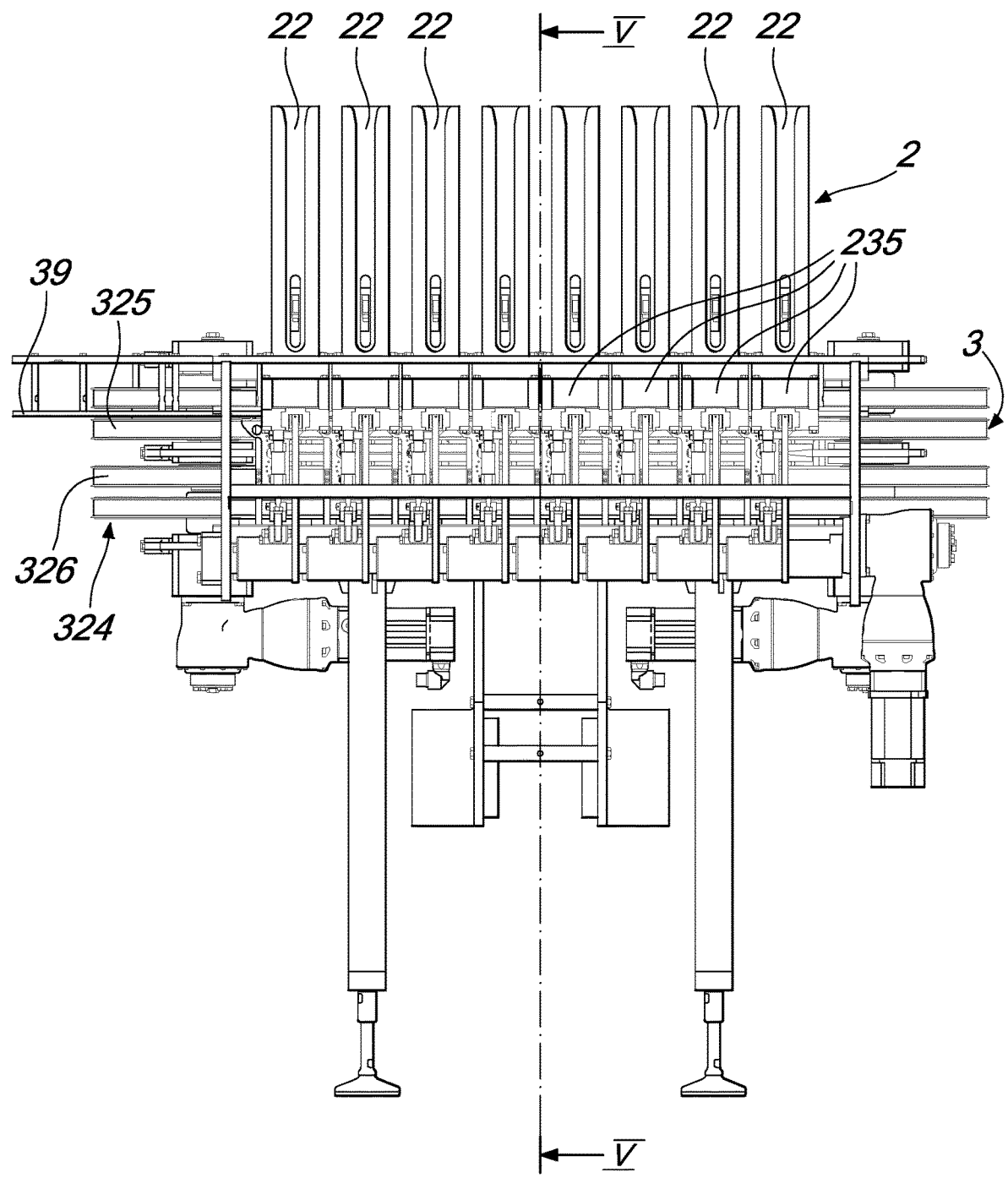
FIG. 4 is a side view of the stations in FIGS. 2 and 3.

With reference to FIGS. 1-24, the reference numeral 1 generally designates a line for packaging containers using thermoforming according to the disclosure. Such line is an FFS (form-fill-seal) line in that it produces filled and sealed containers starting from blanks that are thermoformed, filled and sealed along the line.

The line 1 comprises an assembly 10 for manufacturing containers by thermoforming.

The assembly 10 comprises a magazine 2 of thermoplastic sheet-like blanks G, a station 3 for feeding the blanks G to a station 4 for heating the blanks G, and a subsequent station 5 for thermoforming containers starting from these heated blanks G.

The stations just listed are designed, in the active condition, to be passed through consecutively by sheet-like blanks G in order to produce containers, preferably containers for food use. The blanks, starting from the heating station, and the containers obtained from them are preferably carried from one station to another up to the outlet via transfer star conveyors and optionally via guides which partially surround such transfer star conveyors, as described below with reference to the star conveyors 81, 82, 83 and 84.

The thermoplastic sheet-like blanks G comprise, or are entirely constituted by, a "token" of thermoformable plastic material, for example a thermoplastic polymer, preferably of the type suitable for foods, such as PS, HIPS, PET or the like. Generally, each blank G can have any shape in plan view, for example round, square, rectangular, oval, polygonal, that corresponds to the plan of the final container that it is desired to provide or of the rim of its mouth. In the preferred and illustrated embodiment, each blank G is adapted to the formation of a single container and has, but is not limited to, a disk-like shape.

Preferably, the containers obtained with the thermoforming station 5 are tubs, adapted for example to be filled in the filling station 6 with an edible substance in the form of a particulate or a fluid, for example with yogurt, in order to be then sealed with "peelable" sheet covers (for example plastic/aluminum laminates).

According to the disclosure, the feeding station 3 comprises a closed-loop path 31 and at least two conveyor elements 32, 33 which move, following each other, along the path 31 between a loading position, in which the conveyor element (33 in FIG. 6) faces the blank magazine 2, and an unloading position, in which the conveyor element (32 in FIG. 6) faces the heating station 4.

Figure 13:
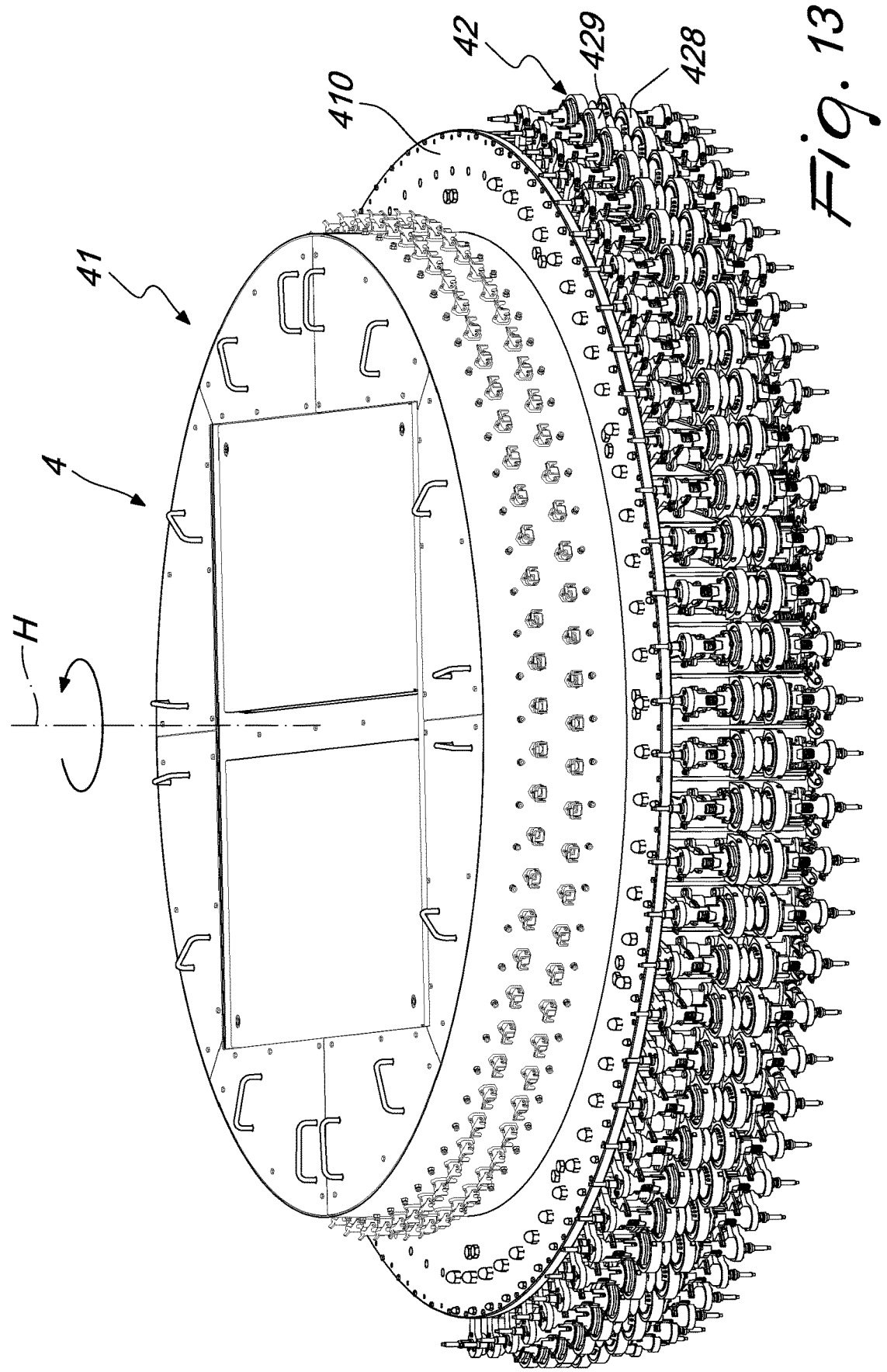
FIG. 13 is a perspective view of a heating station of the line in the previous figures.
Figure 14:
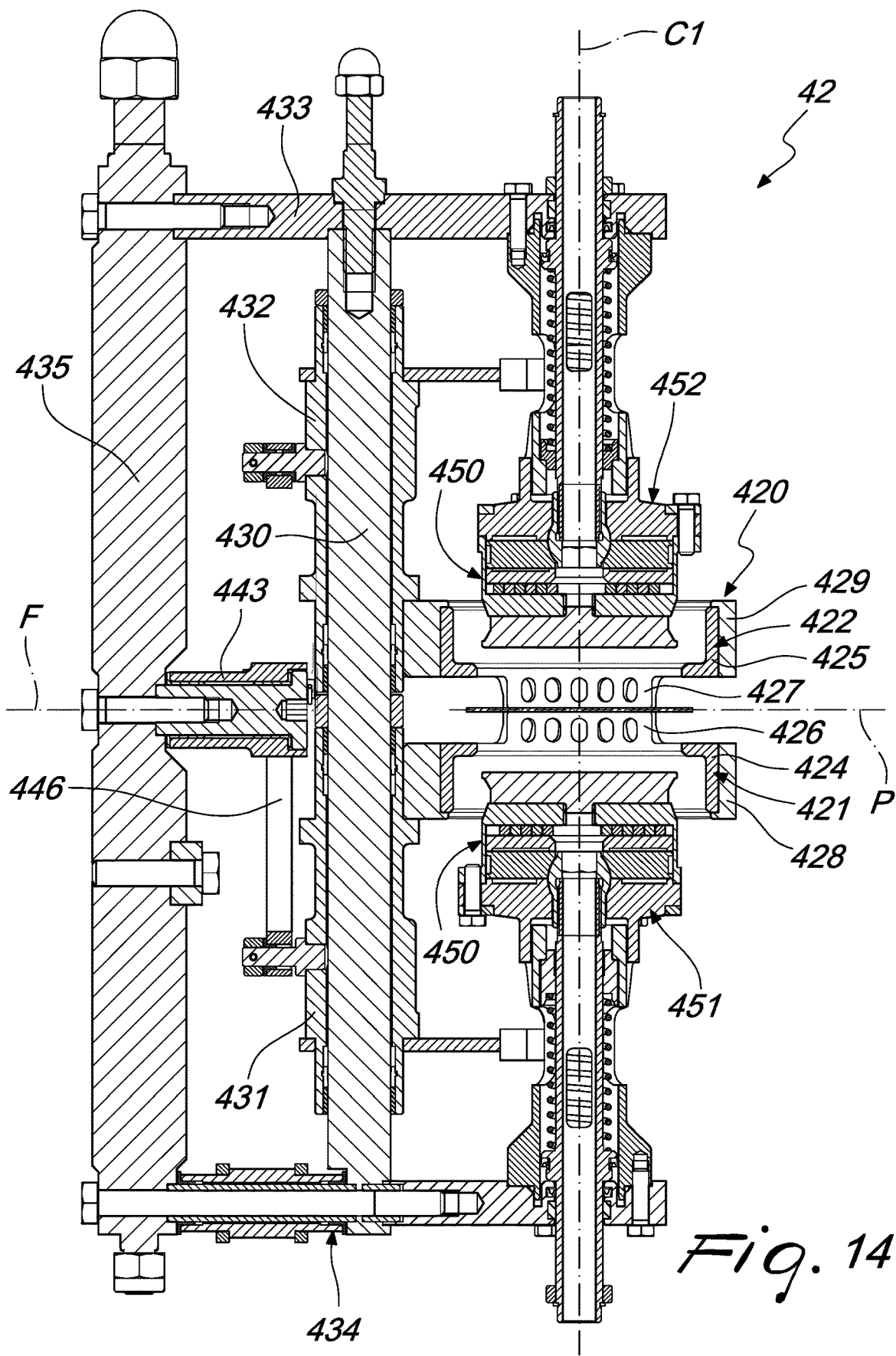
FIG. 14 is a cross-sectional view of a heating head of the station of the previous figure.

According to the disclosure, furthermore, and with reference to FIGS. 13 and 14, the heating station 4 comprises a heating carousel 41 which can rotate continuously and uniformly about a central axis and on which there is a plurality of heating heads 42, which are designed to individually heat the blanks G, as will be explained below.

In the active condition (or operating condition), the conveyor element 32 that is in the unloading position moves with a substantially linear motion with a speed that is substantially equal to and concordant with a peripheral speed of the heating carousel 41 of the heating station 4, so that the speed difference is canceled out in the section where the blank G is unloaded onto the heating carousel 41, between the carousel 41 and the conveyor element 32 that unloads the blank G.

In this manner, rapid loading and high operating speeds of the assembly 10 just described can be achieved: in fact the blanks G are taken from a stationary magazine and transferred to a carousel continuously. The transfer of the blank G from the conveyor element 32 to the heating carousel 41 occurs extremely fluidly because the two speeds (by being equalized) make it possible to prevent jams even if they are very high.

The particulars of the magazine 2 and of the feeding station 3 will be addressed in more detail later.

Considering the heating station 4, this comprises a heating carousel 41 on which there is at least a plurality of heating heads.

In general, the station for heating thermoplastic sheet-like blanks G for the thermoforming line comprises a heating carousel 41 which can rotate continuously about a central axis H and which has a plurality of heating heads 42 which are radially spaced apart from this central axis H, each heating head 42 being adapted to receive at least one respective thermoplastic sheet-like blank at a first peripheral region outside the carousel, to retain this at least one blank during the rotation of the carousel while supplying heat to it, and to release the at least one blank to a second peripheral region outside the carousel which is angularly spaced apart from the first region.

The heating station 4 comprises a heating carousel 41 which can rotate continuously about a central axis H and which has a plurality of heating heads 42 that are radially spaced apart from the central axis H.

Each heating head 42 is adapted to receive at least one respective thermoplastic sheet-like blank G at a first peripheral region 43 outside the carousel, to retain this respective blank G during rotation of the carousel while supplying heat to it in order to make it reach a temperature of thermoforming or permanent deformation, and to release the blank thus heated to a second peripheral region 44 which is outside the carousel 41 and angularly spaced apart from the first region 43. In the second peripheral region 44 an output star conveyor 81 may be provided, which constitutes the input star conveyor for the subsequent thermoforming station 5 and which performs the transfer of the heated blank G from the station 4 to the station 5.

Each heating head 42 can comprise fastening means 420 which are adapted to retain the blank G on a clamping surface P at the peripheral region of the blank G during the heating thereof. Each heating head 42 can also comprise at least one heat source 450 which is associated with the fastening means 420 and which can move with respect to the clamping surface P so as to heat an area of the blank that is not affected by the aforementioned clamping. For example, when the blank G is disk-shaped, as in the case shown in the drawings, the area of the disk which is heated to at least the thermoforming temperature of the material of the blank G is a circle having a smaller diameter than that of the disk, thus leaving a "cold" annulus on the disk on which the fastening means 420 act in order to retain the disk during rotation of the carousel 41 until its release to the output star conveyor 81.

The fastening means 420 preferably comprise at least two jaws 421-422 which are axially mutually opposite and can mutually move along a clamping axis C1 which is substantially parallel to the central axis H of rotation of the carousel 41 in order to clamp between them the blank G at its peripheral region 423.

Such jaws 421, 422 can comprise respective annular structures 424, 425 which are provided with respective protrusions 426, 427, for example curved walls, which perform the clamping of the blank G on opposite faces of the peripheral region. The annular structure 424, 425 is preferably at least partially made of thermally insulating material and optionally the protrusions 426, 427 are perforated so as to reduce as much as possible the exchange of heat with the peripheral region of the blank G.

The jaws 421, 422 are preferably mounted slideably on a same straight guide 430 which is fixed, directly or indirectly, on the peripheral region 410 of the heating carousel 41 and which is directed parallel to the clamping axis C1.

For example, in the preferred embodiment shown, the annular structures 424, 425 are mounted on annular supports 428, 429 which are fixed in a cantilever fashion on sliders 431, 432 which are fitted slideably onto the straight guide 430. Such guide 430 can be fixed to cross-arms 433, 434 of a rod 435 which is fixed directly onto the peripheral region 410 of the heating carousel 41.

The jaws 421, 422 can furthermore be connected to an articulated quadrilateral mechanism 440 which is associated with a cam follower 441 which interacts with a fixed cam 442 of the heating station arranged in a fixed position about the rotation axis H, so as to mutually approach or space apart the jaws 421, 422 via said articulated quadrilateral.

The articulated quadrilateral mechanism 440 can comprise a rocker aim 443 which has a fulcrum F which is rotatably fitted at a fixed point of the peripheral region 410 of the heating carousel, for example on the rod 435, and which has the two respective ends 444, 445 connected to a respective jaw 421, 422 by way of respective links 446, 447, so that a rotation of the rocker arm 443 about the fulcrum F entails the mutual approach or spacing apart of the jaws 421, 422.

The links 446 and 447 can be pivoted on the respective sliders 431, 432.

To command the rotation of the rocker arm 443, one of the ends of the rocker arm 443, for example the first end 445, is advantageously connected to the cam follower 441, which is preferably of the type with a rocker arm and a roller, so that the interaction between the cam follower 441 and the fixed cam 442 commands the rotation of the rocker arm and, as a consequence, the opening and closing of the jaws 421, 422. The connection between the cam follower 441 and the end 445 of the rocker arm in this case is obtained by way of a third link 448.

In an alternative embodiment, not shown, a cam-following roller can be applied directly to the aforementioned end 445 of the rocker arm.

The heat source 450 can also move along the clamping axis C1, and in particular it is moved by way of an actuation independent of the actuation that moves the two jaws 421, 422 with respect to each other, for example by way of a pneumatic actuation.

The heat source 450 is preferably resistive and can be mounted on a pair of supports 451, 452 which can be moved mutually closer from opposite sides toward the clamping surface P, preferably so as to apply a hold on both faces of the blank G and transmit the heat by conduction onto a limited area of such faces which is intended to be deformed during the subsequent thermoforming.

To this end, the supports 451, 452 of the heat source comprise a surface 453, 454 for transmission of heat by conduction which extends below the area of the faces of the blank G to be heated, so that the clamping performed by the jaws 421, 422 takes place in a peripheral sector of the blank which is not directly heated by the heat source 450.

In an alternative embodiment, not shown, the transmission of heat can occur by irradiation, for example with a heat source of the IR lamp type. In this case, the divergence of the IR beam will be such as to heat only the central area of the blank G to a thermoforming temperature. A laser can be used as a further alternative heat source.

Operation of the heating station is evident from the foregoing description. In particular, the carousel 41 is rotated continuously about the central axis H, for example by way of a direct-drive motor on the central shaft of the carousel or a motor connected to such shaft by way of a transmission. In FIG. 13, the direction of rotation of the carousel 41 is anticlockwise.

The fixed cam 442 can be configured to make the rocker arm 443 rotate in the direction of mutual spacing apart of the jaws 421, 422 at the feeding station 3 and in particular at the second outer peripheral region 44, so that each heating head 42 receives a respective sheet-like blank G from the feeding station without stopping. The rotation of the rocker arm in the direction of opening of the jaws can, alternatively, be done by way of a spring, not shown, which acts on the cam follower 441 or directly on one end 444, 445 of the rocker arm 443.

After insertion of the blank G between the fastening means 420, for example by releasing the blank G resting on the protrusions 426, the rocker arm 443 is rotated in the opposite direction with respect to the direction of opening of the jaws 421, 422, by way of the interaction between the cam followers 441 and the fixed cam 442, thus effecting a retention of the blanks G in the respective heating heads 42 along the path from the first region 43 to the second region 44.

During such path, the mutual approach of the supports 451, 452 of the heat source is actuated pneumatically so as to heat the area 449 of the blank G. The temperature reached is substantially equal to or exceeding the thermoforming or permanent deformation temperature of the material that constitutes the blank G.

Once the second peripheral region 44 is reached, the rocker arm 443 is rotated again in order to allow the release of the blanks G, for example to the output star conveyor 81.

Returning now to describe the magazine 2 and the feeding station 3, reference will initially be made to FIGS. 2-5.

The magazine 2 comprises one or more tubular elements 22 for loading, in which the blanks G are placed, stacked onto each other.

The tubular elements 22 for loading can be fixed to a footing common to the footing of the feeding station, as in the accompanying figures, or they can be provided with a dedicated footing fixed to the ground.

In the embodiment shown, the tubular elements 22 extend vertically, while in other embodiments (not shown) they extend horizontally, in which case the blanks G are arranged side-by-side along the horizontal direction and optionally are inclined with respect to such direction.

Figure 5:
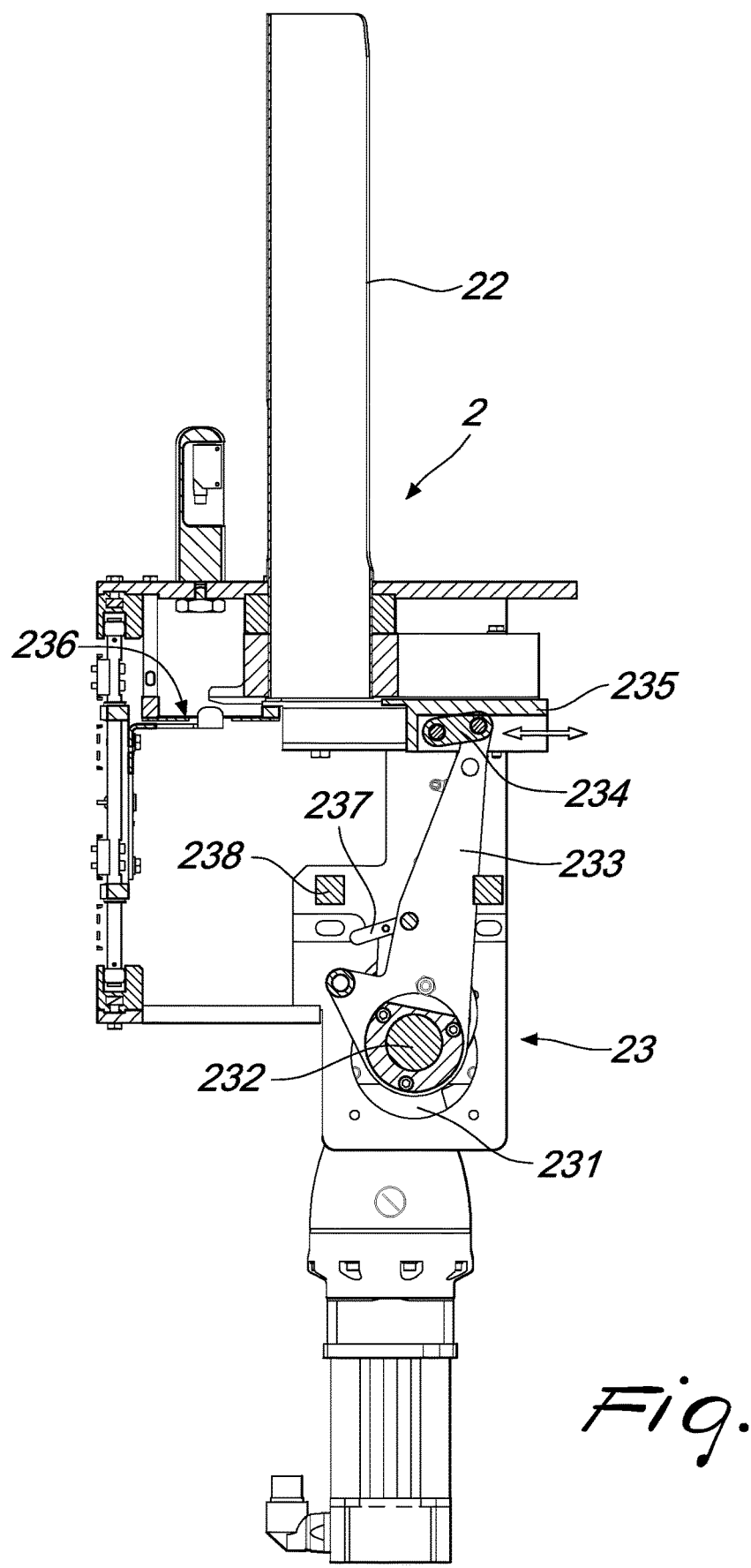
FIG. 5 is a cross-sectional view taken along the line V-V in FIG. 4.
Figure 6:
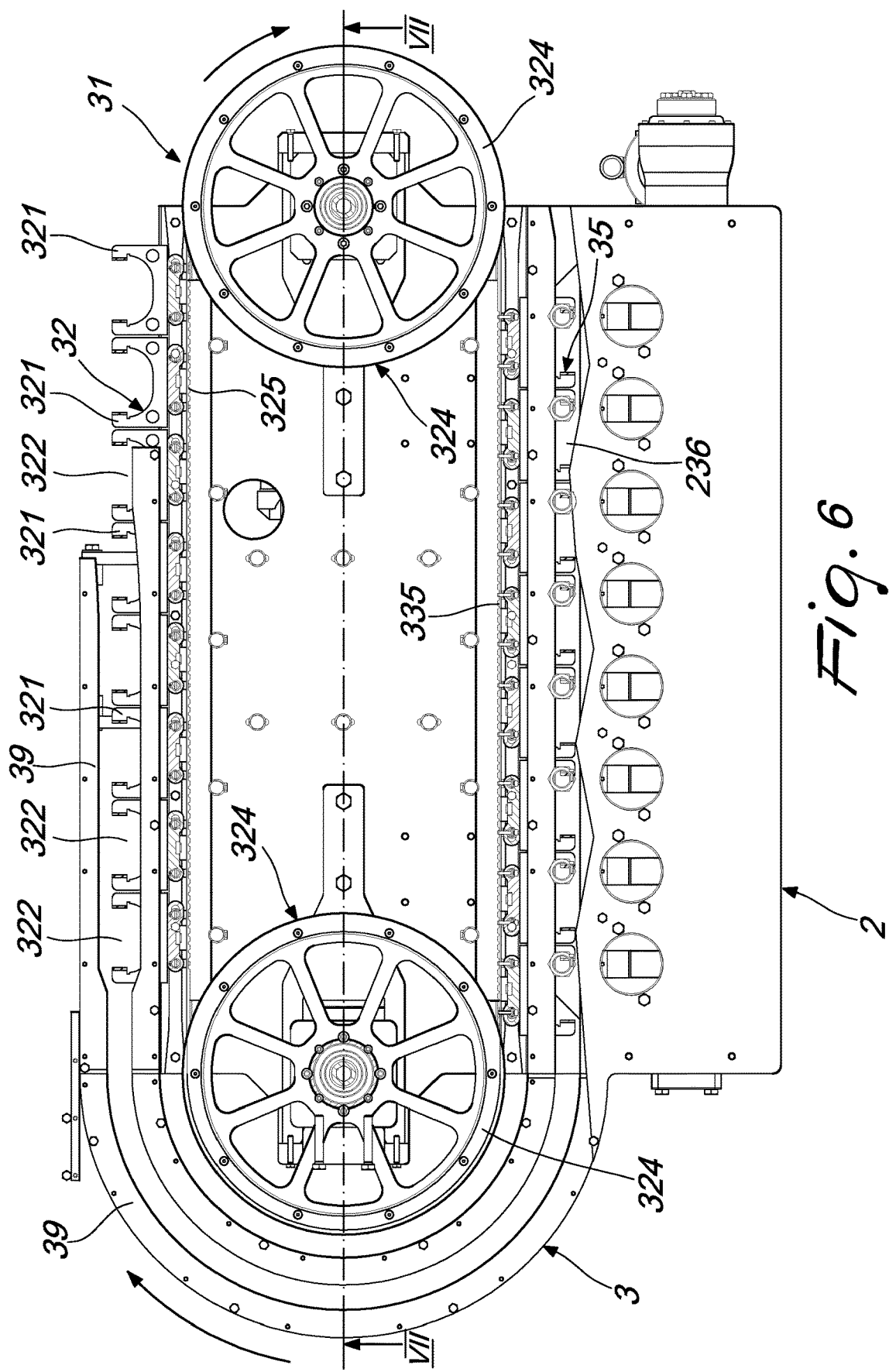
FIG. 6 is a semitransparent plan view from above of the stations in FIGS. 2 and 3.

The magazine 2 furthermore comprises a pickup device 23 for each tubular element 22, which is visible in cross-section in the detail in FIG. 5.

The pickup device 23 comprises a hub 231 which is fitted concentrically onto a rotating shaft 232 which is actuated by an electric motor, not shown.

The hub 231 is connected to a transmission arm 233 which is connected with a link 234 to an actuation drawer 235, which can move with an alternating linear motion.

The actuation drawer 235 is aligned in a position below a (lower) outlet of the respective tubular element 22 and in movement it passes from at least one position in which it leaves the outlet open to a position in which it at least partially closes off that outlet, and vice versa.

The drawer 235 and the passage provided between it and the edges of the outlet of the respective tubular element 22 are such that:

when the drawer 235 is in the open position, the nearest blank G, located at the bottom of the stack, moves downward and is freed from the peripheral retention of the tubular element 22;

when the drawer 235 passes to the closed position, it horizontally moves such blank G toward a pick-up region 236 while at the same time preventing the stack of blanks G above from moving downward.

The alternating linear motion of the drawer 235 in operation therefore causes a displacement of individual blanks G from the tubular element 22 to the pick-up region 236.

Advantageously each tubular element comprises a corresponding drawer; the individual drawers 235 can be stopped, so as to also enable an only partial supply of the blanks G to the pick-up region 236: to this end there are locking rods 237 mounted so that they can oscillate on the transmission arm 233 between a locking position (FIG. 12) in which they interfere with a fixed abutment 238 and a position (FIG. 11) in which they release the movement of the transmission arm 233, in which position they do not interfere with the fixed abutment 238.

In a variation, the tubular elements 22 are arranged horizontally instead of vertically; also in this variation, however, the blanks are in the pick-up region 236 arranged horizontally starting from a position (inside the tubular element 22) in which they are arranged vertically.

To do this, in this variation, not shown, the blanks G are individually arranged substantially vertically and side-by-side in a horizontal direction and there is a pickup device that comprises for example an articulated arm provided with a gripping end (for example with a sucker) which picks up a blank from the magazine and deposits such blank on a curved chute that conveys such blank, arranging it horizontally, to the pick-up region 236.

Figure 7:
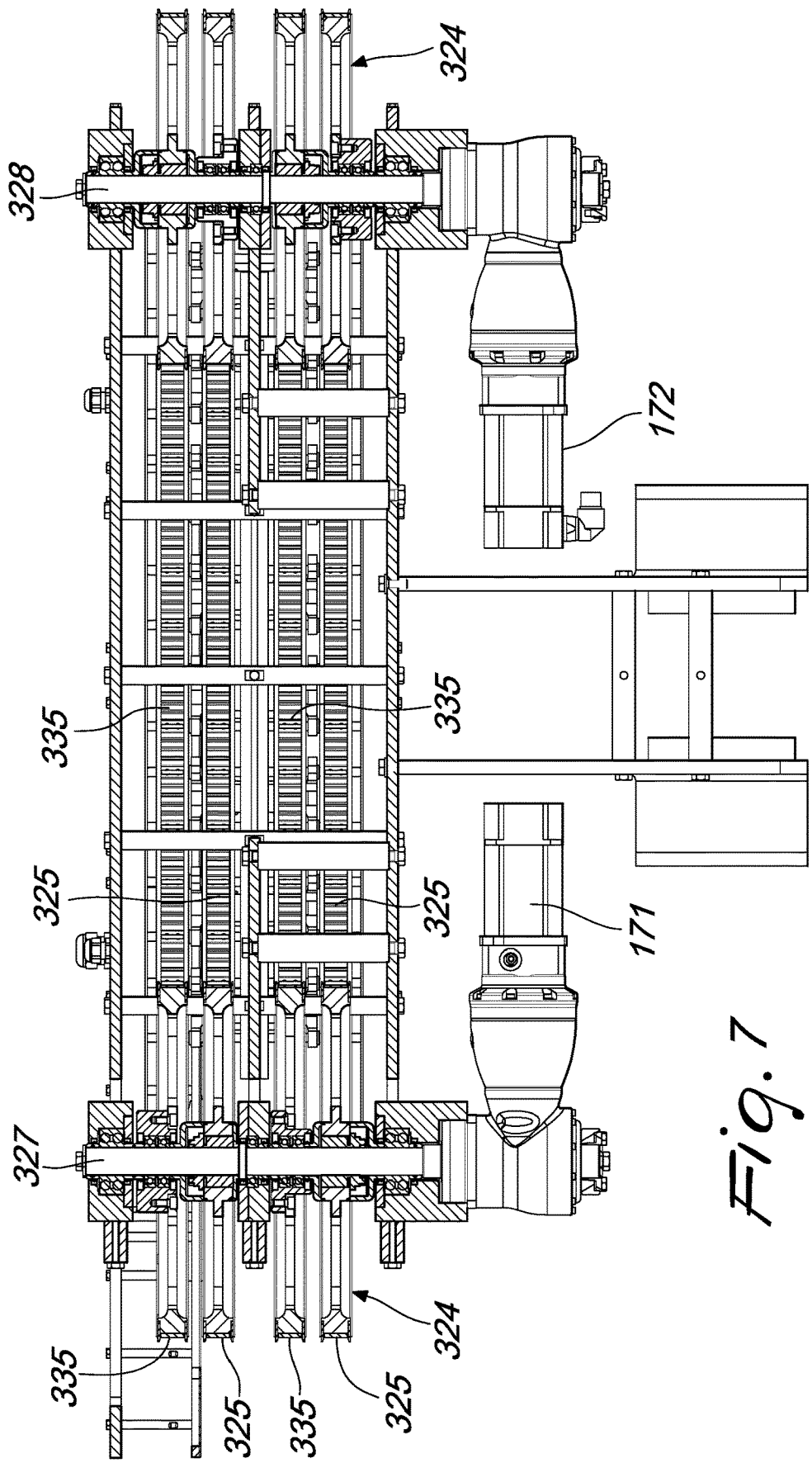
FIG. 7 is a cross-sectional view taken along the line VII-VII in FIG. 6.
Figure 8:
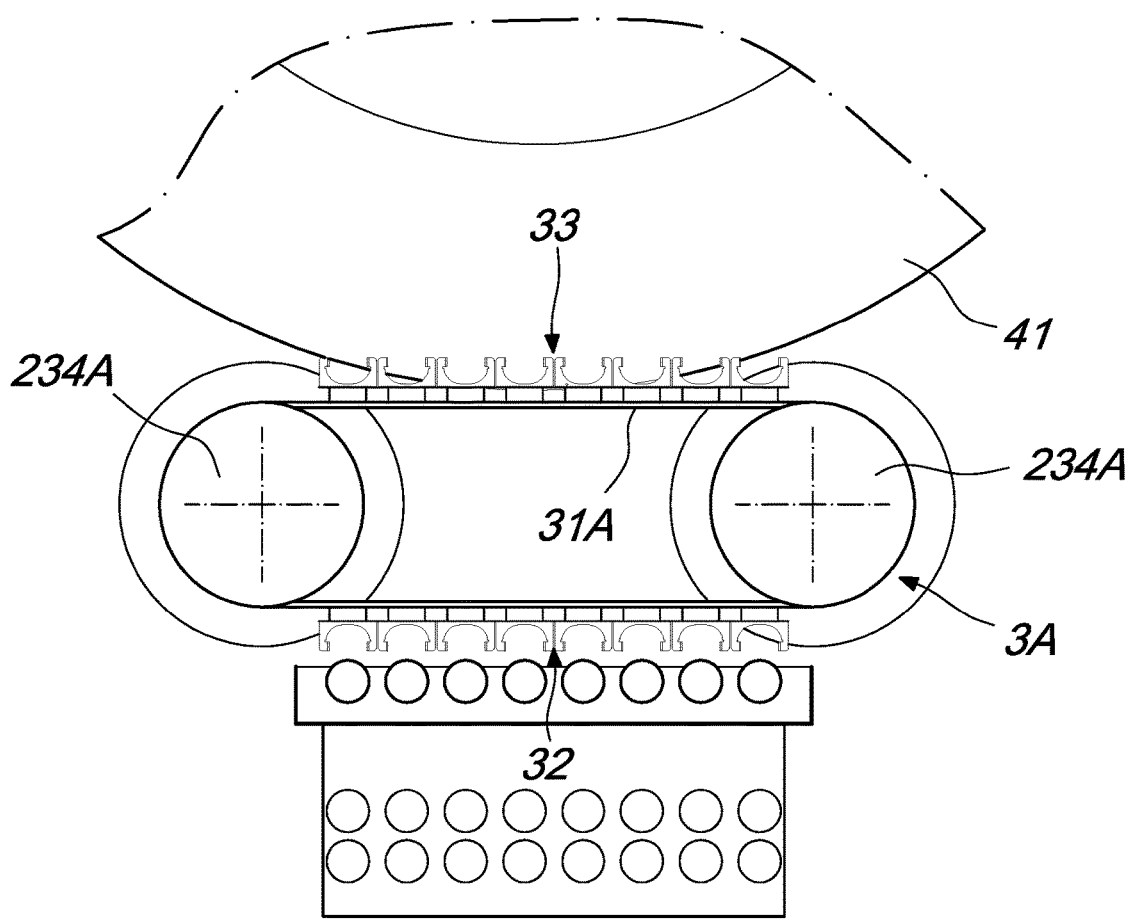
FIGS. 8 and 9 are a plan view and a side view of a variation of the feeding station of the line in the previous figures.
Figure 9:
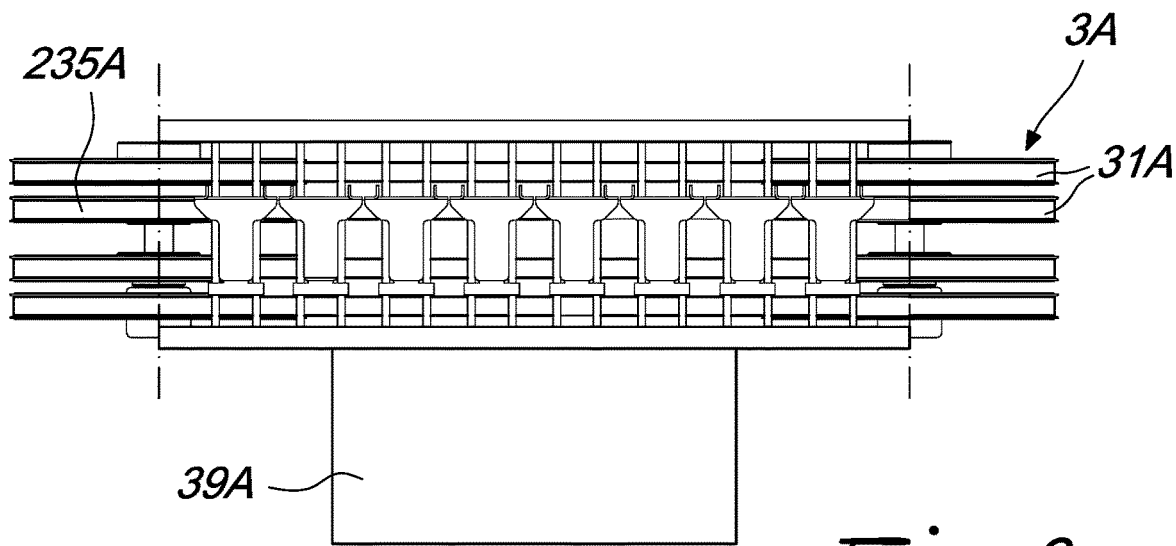
Figure 10:
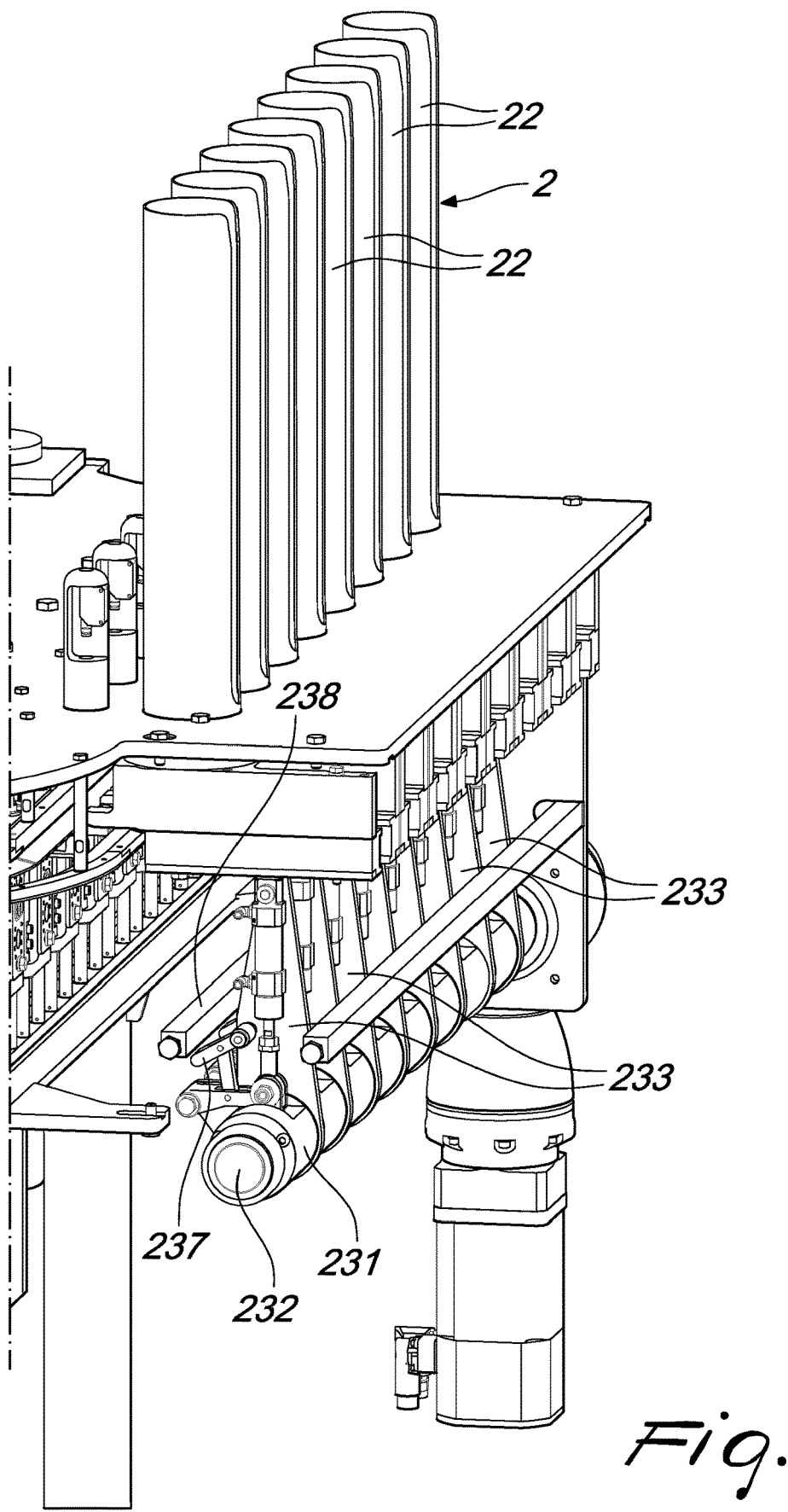
FIG. 10 is a perspective view of part of the magazine of the line in the previous figures.
Figure 11:
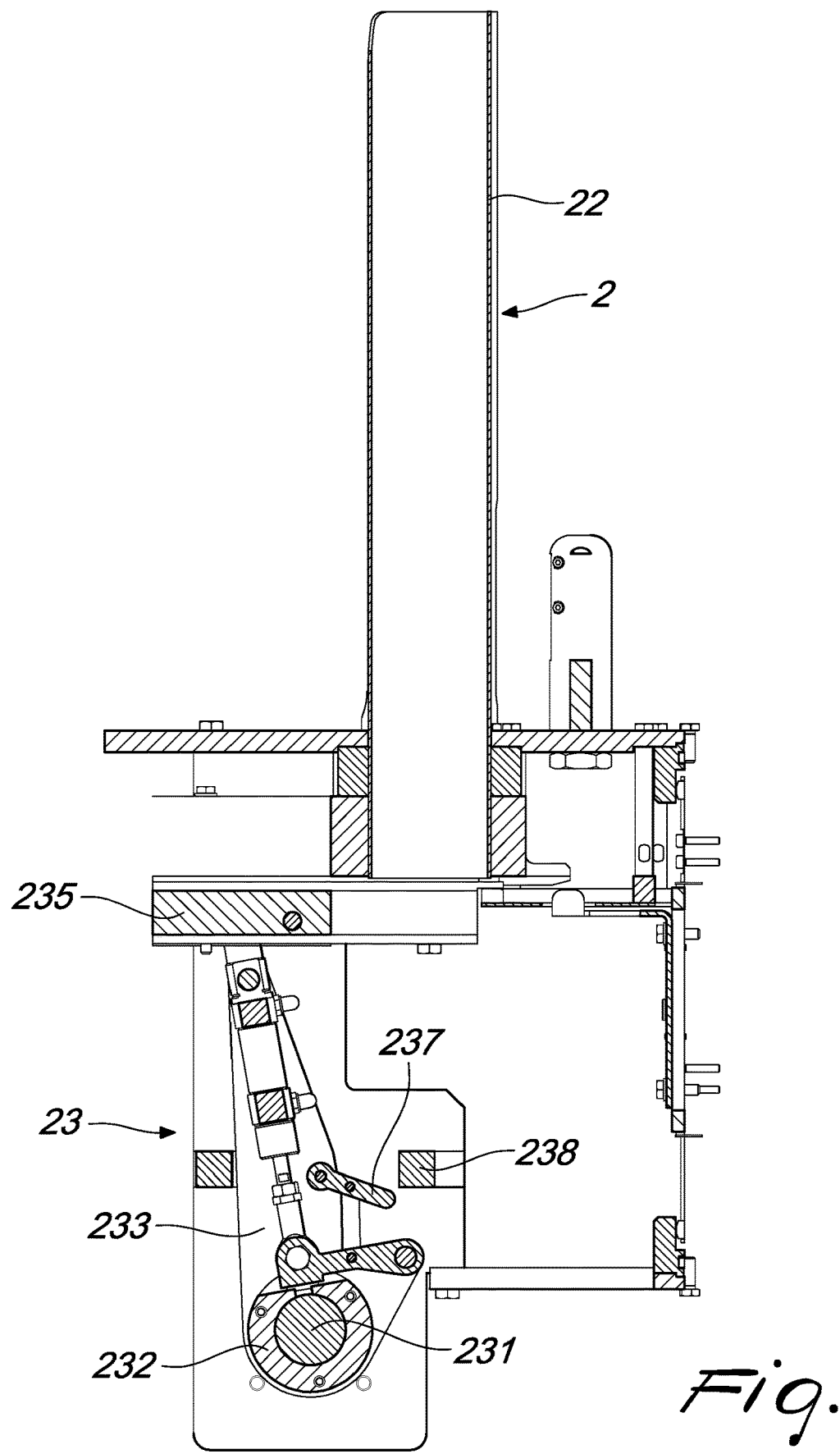
FIGS. 11 and 12 are cross-sectional views of the magazine station of the previous figure, in two different active conditions.
Figure 12:
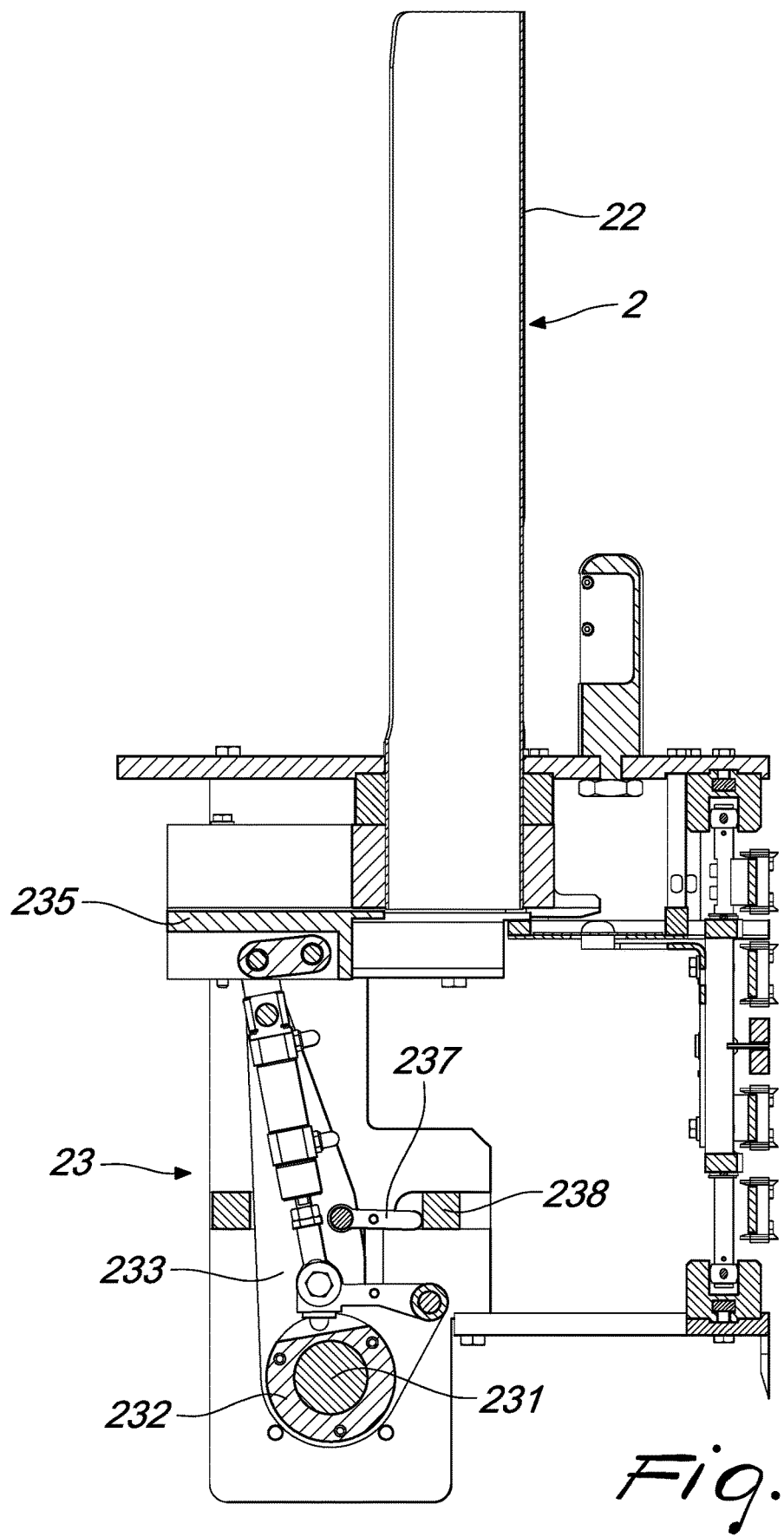

Turning now to describe the feeding station 3 in more detail, FIGS. 1 to 7 show a first preferred embodiment thereof, while FIGS. 8 and 9 show a variation thereof.

In the first embodiment, the feeding station 3 comprises a separate kinematic chain 325, 335 for each conveyor element 32, 33 so as to guide each conveyor element 32, 33 separately in motion along the closed-loop path 31.

The conveyor elements 32, 33 each comprise a train of adjacent pusher fingers 321 which define reception cells 322 for the blanks G.

Each conveyor element 32, 33 is coupled to a dedicated flexible kinematic transmission chain 325, 335; in the example, each flexible kinematic chain 325, 335 comprises a pair of toothed belts, but they could equivalently be a chain or the like.

The pairs of belts 325, 335 are wound on, and moved by, two multiple driving pulleys 324 with parallel and preferably vertical axes.

With reference to the non-limiting example shown in FIG. 7, it should be noted that each multiple pulley 324 to this end comprises four concentric and overlapped pulley wheels; each pulley wheel engages one belt of a pair 325, 335.

In particular, of the four wheels of each multiple pulley 324, only two are coupled to a respective driving shaft 327, 328 which is moved by a respective electric motor 171, 172, while the other two pulleys wound around by the same belts that wind around the aforementioned pulleys that are coupled to the respective driving shaft 327, 328 are idle with respect to that shaft 327, 328.

Advantageously, for the stability of the whole, the belts of the first pair 325 are alternated with those of the second pair 335 along the direction of the rotation axes of the pulleys 324.

From the foregoing description it will be seen that one of the two electric motors 171 (or 172) moves a respective pair of belts 325 (or 335) and, as a consequence, a respective conveyor element 32 (or 33).

These latter items can thus move, coordinated with each other but independently of each other, so that while one conveyor element 32 or 33 is in the pick-up region 236 with a substantially nil speed with respect to that region (and to the magazine), the other conveyor element 33 or 32 is in the unloading position with a speed substantially equal to the peripheral speed of the heating carousel 41 or of an optional intermediate transfer star conveyor.

The train of pusher fingers 321 (and as a consequence the reception cells 322) of the two conveyor elements 32, 33 are arranged at the same height, so as to interface in an identical manner with the pick-up region 236 and with the heating carousel 41.

The closed path 31 followed by the conveyor elements 32, 33 extends on the plane along a first substantially straight portion facing the magazine 2, followed by a first curved portion at a pulley 324, followed by a second substantially straight portion facing toward the heating carousel 41, and then by a second curved portion at the other pulley 324.

In other embodiments of the disclosure, not shown, there can be closed paths of different form.

The feeding station 3 also comprises peripheral guide rails 39 which are adapted to guide the blanks G, pushed by the fingers 321, during the step of moving the blanks G from the magazine 2 to the heating carousel 41.

Preferably the guide rails 39 are provided at least at part of the first straight portion, of the first curved portion and at part of the second straight portion.

Operation of the feeding station 3 in the embodiment just described entails the following.

When one conveyor element (or loading element) 32 is facing the magazine 2 in order to move a first load of blanks G positioned at the pick-up region 236, the other conveyor element (or loading element) 33 is facing the heating carousel 41 in order to unload its blanks onto the heating carousel 41, downstream.

In particular, the conveyor element 32 facing the magazine 2 is substantially stationary, while the conveyor element 33 facing toward the heating carousel 41 moves with a speed about equal to the peripheral speed of the heating carousel 41 or of a transfer star conveyor optionally arranged therebetween.

The conveyor elements 32, 33 move, following each other, along the path 31 between the loading position, in which the conveyor element (33 in FIG. 6) faces the blank magazine 2, and the unloading position, in which the conveyor element (32 in FIG. 6) faces the heating station 4.

Pickup occurs by synchronizing the movement of the drawer 235 with that of the conveyor elements 32, 33: in essence, when a conveyor element 32 or 33 is in the loading position, the drawer 235 feeds a load of blanks into the pick-up region 236 that coincides (in this position) with the reception cells 322 defined between the fingers 321.

The direction of motion of the blank toward the pick-up region 236 is thus substantially perpendicular to, and on the same plane as, the direction of movement of the fingers 321 of the conveyor element 32, 33 in the loading position.

Portions at different speed are provided in the motion along the closed path 31. More specifically, the acceleration imparted by the electric motors 171 and 172 to the conveyor elements 32, 33 is such that when one conveyor element 33 facing toward the heating carousel 41 has almost finished the unloading of the blanks G and is about to leave the second position, the other element 32 is already positioned immediately behind the first; in this way a continuous loading of the heating carousel 41 is achieved which does not leave any heating head 42 empty (unless a malfunction occurs).

In the variation in FIGS. 8 and 9, the feeding station 3A instead comprises a single flexible kinematic chain for all the conveyor elements 32, 33, which are therefore driven together in motion along the closed-loop path 31A. The conveyor elements 32, 33 are similar to those of the first embodiment, i.e. they have pusher fingers 321 and they push the sheet-like blanks G, which are received from a magazine, along a guiding track which at least partly surrounds the feeding station 3A.

The feeding station 3A also comprises a base 39A on which the closed-loop path 31A is mounted so that it can oscillate.

The flexible kinematic chain 235A (which may comprise chains or belts, single or multiple, similarly to the chains of the first embodiment) is moved by a chain motor and the base is moved by a respective base motor (these motors are not shown).

The base motor is adapted to make the base 39A oscillate rigidly, in a horizontal direction i.e. tangential to a pitch circle of the heating carousel 41.

The chain motor is designed to move, at two different speeds, the kinematic chain 235A proper between two pulleys 234A (similarly to the previous case) thus defining the closed path 31A followed by the conveyor elements 32, 33.

The speed of the chain motor oscillates periodically between two values higher than zero and the speed of the base motor oscillates periodically, with the same period or duty-cycle as the speed of the chain motor, between two identical values with mutually opposite signs and in phase quadrature with the speed of the chain motor, so that the speed of the conveyor element 32 in the loading position is substantially zero and the speed of the conveyor element 33 in the unloading position has a value that is substantially equal to a peripheral speed of the heating carousel 41 of the heating station 4 or of an optional intermediate transfer star conveyor.

This type of solution described with reference to FIGS. 8 and 9 is known in a different sector and is described in U.S. Pat. No. 6,499,280.

Downstream of the heating station 4 a transfer wheel or transfer star conveyor 81 is provided, which moves the heated blanks to the subsequent thermoforming station 5.

Figure 24:
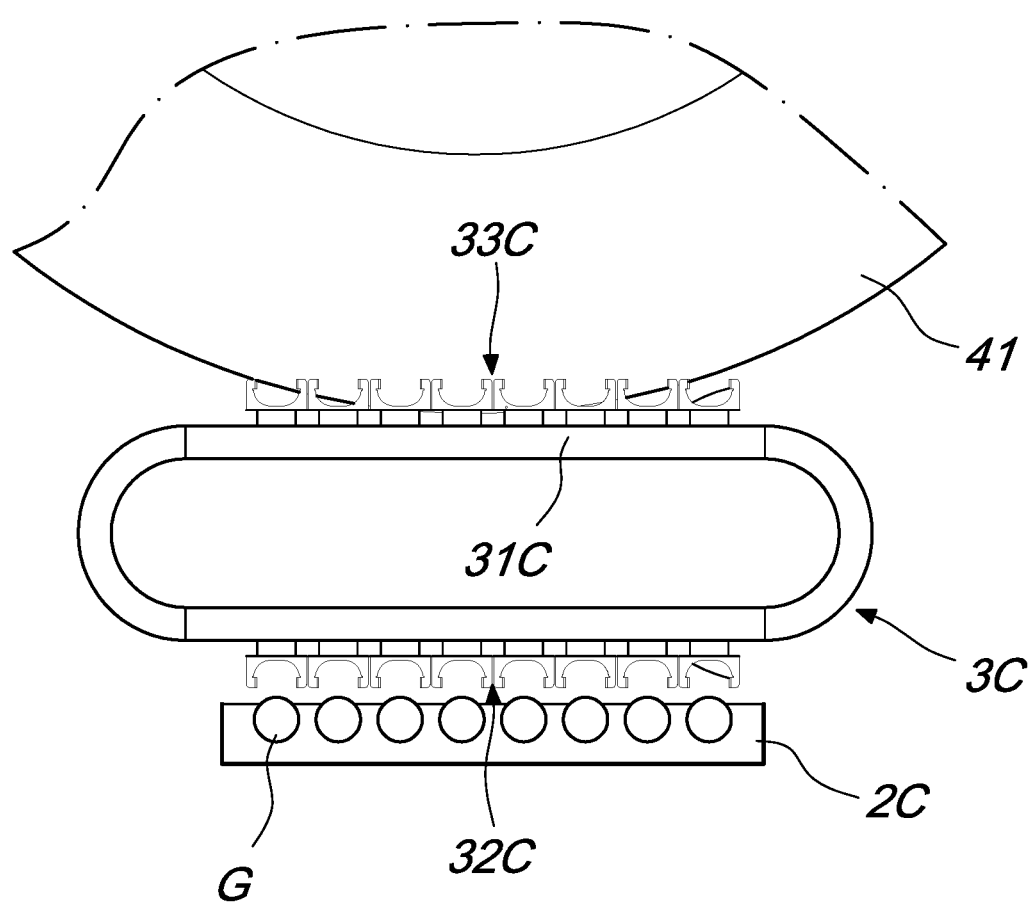
FIG. 24 is a schematic plan view of a further variation of the feeding station of the line of FIG. 1.

In a further embodiment of the disclosure, depicted in FIG. 24, instead of the feeding stations 3A described above, a feeding station 3C is designed as a long stator linear motor, comprising a number of transport rails which are arranged so as to form an oval track and along which a plurality of electrical driving coils, which form the stator, are longitudinally arranged (not shown in the figure). These driving coils are adapted to interact with excitation magnets suitably arranged on conveyor elements 32C, 33C. The conveyor elements 32C, 33C are slidable along the transport rails and are similar to the conveyor elements 32, 33 of the first embodiment, i.e. the conveyor elements 32C, 33C have pusher fingers adapted to push the sheet-like blanks G, which are received from a blank magazine 2C similar to blank magazine 2, along a blank guiding track which at least partly surrounds the feeding station 3C (not shown in the figure).

By controlling the electrical stator current of the driving coils for each of the conveyor elements 32C, 33C a propulsive force is independently generated, which moves the conveyor elements 32C, 33C in the longitudinal direction along the transport rails i.e. along the oval track. The driving coils are so controlled as to stop a part of the conveyor elements (e.g. 32C) at the loading position, i.e. at the blank magazine 2C, for receiving the sheet-like blanks G, while another part of the conveyor elements (e.g. 33C) move in the unloading position at the same peripheral speed of the heating carousel 41, so as to release the sheet-like blanks G to the heating station 4.

Figure 15:
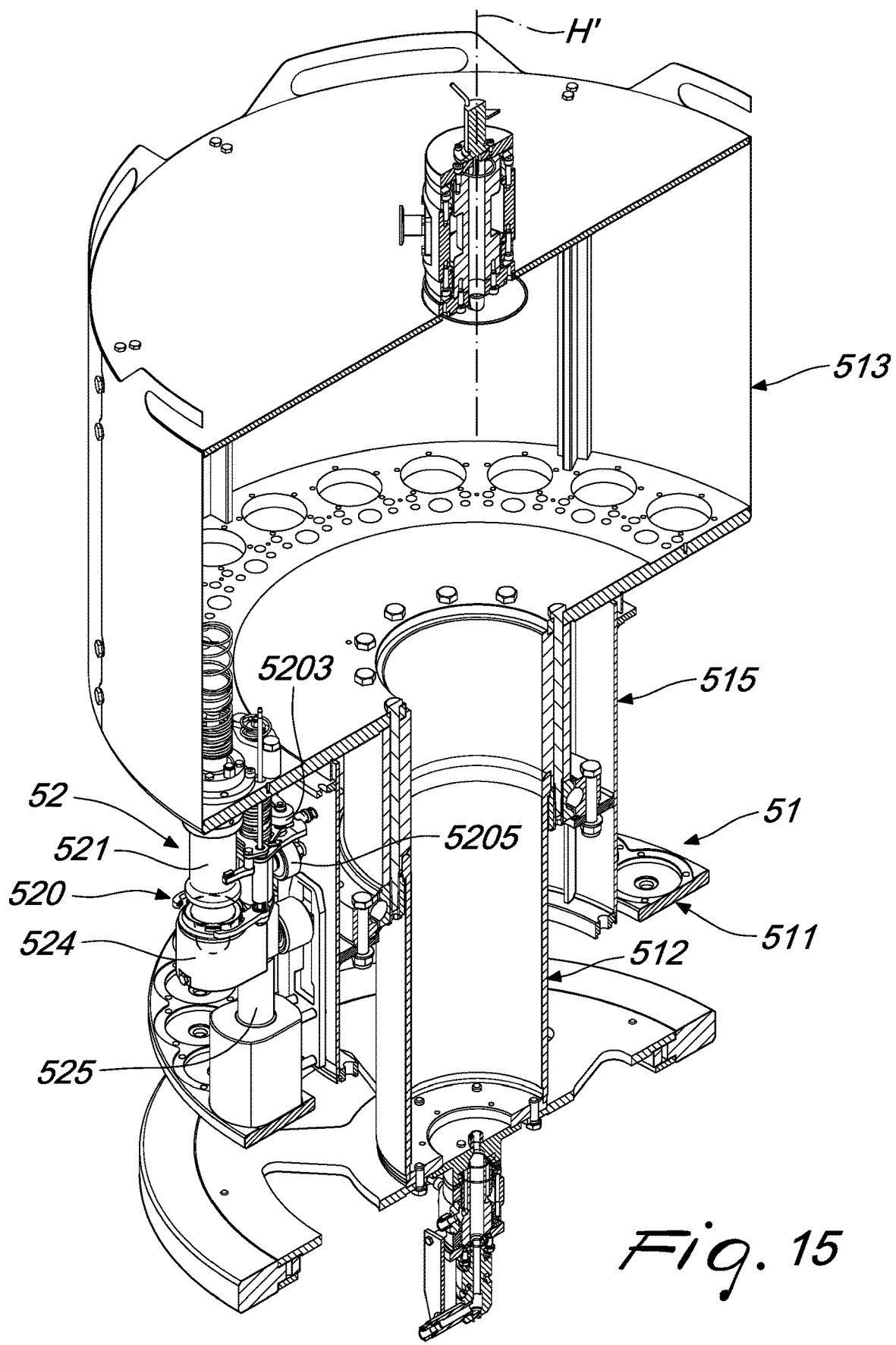
FIG. 15 is a cross-sectional perspective view of a thermoforming station of the line in the previous figures.
Figure 16:
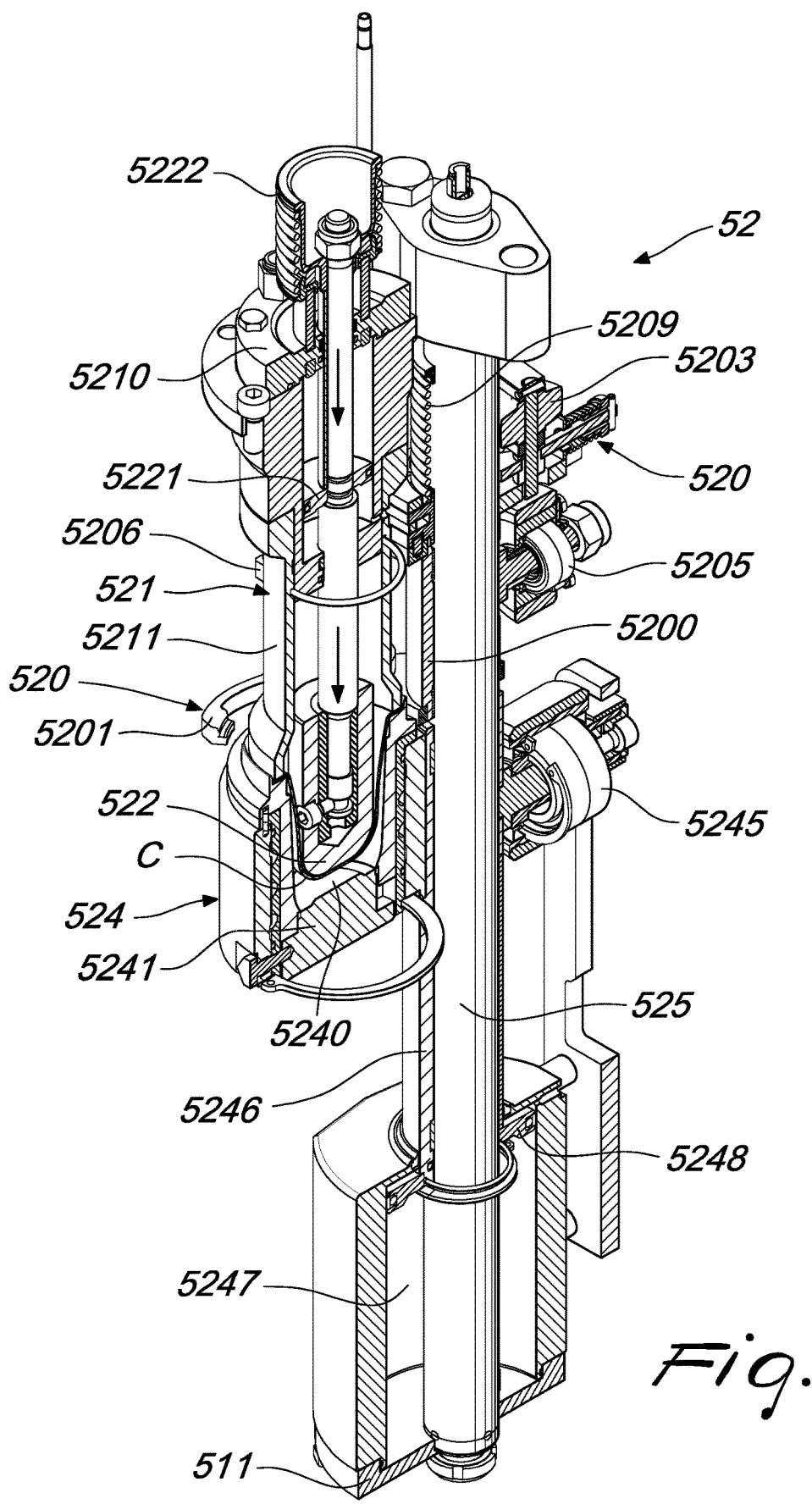
FIG. 16 is a cross-sectional view of a thermoforming head of the station of the previous figure.

With reference to FIGS. 15 and 16, preferably, the containers C obtained with the thermoforming station 5 are tubs, adapted for example to be filled in the filling station 6 with an edible substance in the form of a particulate or a fluid, for example with yogurt, in order to be then sealed with "peelable" sheet covers (for example plastic/aluminum laminates).

The thermoforming station 5 comprises a thermoforming carousel 51 which can rotate continuously about a central axis H' and which has a plurality of thermoforming heads 52 that are radially spaced apart from the central axis H'. Only one of such thermoforming heads 52 is shown in the drawings for the sake of simplicity.

Each thermoforming head 52 is adapted to:
receive at a first, input peripheral region 53, outside the carousel, at least one respective thermoplastic sheet-like blank G, conveniently preheated;
retain the respective blank G during rotation of the thermoforming carousel 51 while it imparts a deformation in order to make it assume a desired container C shape; and
release the container C thus obtained to a second, output peripheral region 54, which is outside the thermoforming carousel 51 and angularly spaced apart from the first region 53.

In the first peripheral region 53 there can be an input star conveyor 81, while in the second peripheral region 54 there can be an output star conveyor 82.

The thermoforming carousel 51, in particular, can comprise a lower support ring 511 which is integral with an upper chamber 513, which is also fixed to a central hub 512 and can rotate therewith. The thermoforming carousel 51 also comprises a fixed bulkhead 515, with respect to which the ring 511 rotates together with the chamber 513. Cam-shaped guide profiles protrude radially from the bulkhead 515, and will be described later.

The chamber 513 is preferably adapted to accommodate the compressed air devices which will be described below.

Each thermoforming head 52 can comprise a device 520 for gripping the sheet-like blank G, at least for gripping the blank arriving from the first region 53 and for positioning it at a molding region.

Furthermore, each thermoforming head 52 can comprise:
a bell assembly 521 for thermoforming equipped at least with a thermoforming drawing device 522 and means for actuating the drawing device 522 and with compressed air blow-molding devices; the means for actuating the drawing device 522 are preferably pneumatic and the drawing device 522 together with the compressed air blow-molding devices is adapted to form a container C by way of drawing and subsequent blow-molding of the sheet-like blank G;
a mold 524 to allow the deformation of the sheet-like blank G until it reaches the desired shape of the container C; the mold 524 can be movable at least between a position in which it is arranged close to the bell assembly 521 and a position in which it is arranged away from the bell assembly 521.

Preferably, in the position in which the mold 524 is arranged close to the bell assembly 521, the plastic deformation occurs of the blank G from the sheet-like configuration G to that of a container C, while in the position in which the mold 524 is arranged away from the bell assembly 521 the steps of loading the sheet-like blank G and unloading the container C from the thermoforming station are carried out.

Each thermoforming head 52 is associated with a dedicated upright column 525 on which all or some of its components move and/or are supported. The upright column 525 is fixed on the ring 511 and extends vertically with its axis parallel to the rotation axis H' of the thermoforming carousel 51.

Going into more detail, each gripping device 520 can move on the respective column 525 and to this end comprises a guide sleeve 5200 that can slide on the column 525 and a first cam-following roller for movement 5205 which, in the rotary movement of the head 52 on the thermoforming carousel 51, cooperates with a dedicated fixed cam (not shown) which determines the vertical translation along the column 525 of the gripping device 520 as a whole, in order to synchronize it with the movement of the underlying mold 524. The gripping device 520 also comprises a return spring 5209 which is mounted on the column 525 and acts on the device 520 proper, working against the cam-following roller 5205.

To support the blank G along its peripheral region during the positioning and/or during the plastic deformation and when the mold 524 is moved away from the bell assembly 521, the gripping device 520 is advantageously provided with grippers 5201 which are articulated to an actuation mechanism which in turn is functionally connected with a second cam-following roller 5203 for actuating grippers which cooperates with a dedicated fixed cam (not shown) so as to determine the opening and closing of the grippers 5201 at reference angular positions during the rotation of the thermoforming head 52 in operation.

The grippers 5201 advantageously comprise at least two mutually opposing push points, more preferably four mutually opposing push points, in order to conveniently support the heated blank G received from the input star conveyor 81 and, at the end of the thermoforming, the container C, when the mold 524 is moved away from the bell assembly 521.

Preferably, each gripping device 520 is also provided with anti-rotation elements that are designed to prevent any rotation movements thereof around the column 525; in the preferred and non-limiting embodiment, such anti-rotation elements 5206 are in the form of arms that are integral with the guide sleeve 5200 and which end in anti-rotation runners which in operation are in contact with the adjacent bell assembly 521.

In operation, the heated blank G that arrives at the thermoforming carousel 51 at the first peripheral region 53 is engaged by the grippers 5201 of the gripping device 520 and is positioned and optionally held in the position in which its thermoforming will take place, and is released by the grippers 5201 at least at the second peripheral region 54, by which time the container C has now been created.

Turning now to describe in more detail the preferred embodiment of the bell assembly 521, this comprises a flange 5210 for fixing to the upper chamber 513, so that the bell assembly 521 remains fixed with respect to the column 525.

The assembly 521 comprises a bell 5211 within which the drawing device 522 is moved alternately in operation by means for actuating the drawing device 5221.

Preferably such means for actuating the drawing device 5221 are pneumatic and comprise a pneumatic actuator that actuates the stem of the drawing device 522 in the direction of the mold 524 when the thermoforming head reaches a preset angular position in its rotary movement about the axis H'.

Working against the means for actuating the drawing device 5221, there is a return spring 5222 which also acts on the stem of the drawing device proper in order to return it to a position away from the mold 524.

Compressed air blow-molding devices are also provided (not shown) which in the preferred embodiment comprise at least one conduit for conveying compressed air which is connected to a source of compressed air that supplies the bell 5211 when the thermoforming head of the drawing device 522 has drawn the blank G.

Operation of the bell assembly 521 will be described in more detail after describing the cooperating mold 524.

The latter, in the preferred embodiment shown, comprises a mold die 5240 that has a shape adapted to generate a container C of the preferred shape and dimensions. The free upper edges of the mold die 5240 advantageously comprise radial recesses into which the free ends that constitute the push points of the grippers 5201 can be inserted, so as to define an annulus of substantially uniform width, suitable for the axial gripping of the blank G during the drawing and blow-molding and in order to facilitate the operations of depositing the blank and picking up the container.

However, advantageously, also at the above mentioned radial recesses, the free upper edges of the mold die 5240 define an uninterrupted circumferential support annulus, sufficient for the axial gripping of the blank G during the drawing and blow-molding.

Preferably the mold 524 comprises a cooling system for cooling at least the perimeter walls of the die 5240, so as to facilitate the solidification of the material of the blank G during the drawing operation that generates the container C; in a preferred embodiment the cooling system comprises conduits for conveying a fluid around the wall of the die 5240.

In this regard, according to a preferred embodiment, the mold die 5240 is selectively removably coupled (e.g. by way of engagement with a grub screw) to a supporting bottom 5241 which is part of the mold 524 proper; this makes it possible to rapidly change the mold die 5240 if it is worn or if the shape of the containers C to be produced needs to be modified.

The supporting bottom 5241 and more generally the mold die 5240 can move on the column 525 in order to allow the alternating motion of the mold 524 from and toward the bell 521 in operation; to this end there is a mold cam-following roller 5245 which cooperates with a fixed cam (not shown), in order to produce the translation of the mold 524 along the column 525, at predetermined angular positions of the head 52 in its circular motion.

The mold 524 is, to this end, provided with a sleeve 5246 that embraces the column 525 so that it can slide.

Optionally, there is also a pneumatic tightening device which is adapted to force the upper free peripheral edges of the mold die 5240 into contact with the blank G against the bell 521.

The pneumatic tightening device in the preferred and illustrated form comprises a variable-volume chamber 5247 in which a partition 5248, integral with the sleeve 5246, is hermetically accommodated; the variable-volume chamber 5247 is defined between an outer case fixed to the lower support ring 511 and the sleeve 5246 can be moved along the column 525 and coupled with the mold die 5240. The variable-volume chamber 5247 is also provided with an intake for supplying compressed air and with an outlet.

Preferably the compressed air that supplies the chamber 5247 passes through a dedicated passage defined in the column 525.

To describe the operation, a thermoforming head 52 in its continuous rotary motion about the axis H' will be herein examined, ignoring the operation of the gripping device 520, which is already described above. The continuous rotation of the thermoforming carousel 51 about the central axis H' can be obtained, for example, by way of a direct-drive motor on the central shaft or hub of the carousel or a motor connected to such shaft by way of a transmission.

During such rotation, when the mold 524 is spaced apart from the bell assembly 521, the heated sheet-like blank G is positioned by the input star conveyor 81 in the thermoforming region, where it rests peripherally on the push points of the grippers 5201 which are in the closed position.

In this situation, the heated blank G can also rest on the upper free edges of the mold die 5240, or such mold die 5240 can be in a lowered position together with the mold 524 and be raised until it is brought to the height of the grippers 5201 so as to define, together therewith, a single, broader resting surface for the blank G.

Subsequently, moved by the respective mold cam-following rollers 5205 and 5245, the gripping device 520 and the mold 524 perform a translational motion vertically along the column 525 in the direction of the bell assembly 521, until the perimetric annulus of the blank G is engaged between the mold and the bell assembly, more precisely between the upper free peripheral edges of the mold die 5240 and the lower free peripheral edges of the bell 5211. Advantageously, the grippers 5201 can remain in the closed position in such situation, so as to render uniform the lower resting surface of the heated blank G, or remain open (as in FIG. 16).

Subsequently the drawing device 522 is moved, performing a translational motion downward until it comes into contact and deforms, by drawing it, the blank G in order to make it take on an intermediate shape that substantially corresponds to the desired shape of the container C.

During the descent of the drawing device 522 or at its end, compressed air under pressure is injected into the volume between the drawing device and the deformed blank, according to a conventional technique (for example between 3 and 6 bar); the compressed air is conveyed into the now-concave region of the deformed blank and deforms it further, pushing it into contact with the walls of the mold die 5240 in order to thus generate the desired shape of the container C. Given that the walls of the mold die are colder than the material of the container C, such material cools upon contact with it, hardening as it does so. Such effect is increased when the walls of the mold die 5240 are cooled, as described above. Thus the container C has been created.

At a later time, after the depressurization of the chamber defined between the bell and the container C, the mold 524 is moved away again from the bell assembly 521 and is brought to a position that is spaced apart, where the space that is created between the mold 524 and the bell assembly 521 is at least sufficient for extracting the container C at the second region 53, by pulling it radially from the grippers 5201, conveniently open, by way of the output star conveyor 82.

Advantageously, the gripping device 520 is also lowered by way of the cam-following roller 5205 to a distance sufficient to separate the container C from the bell 521, thus further facilitating the extraction of the container from the grippers 5201 by the output star conveyor 82.

Figure 17:
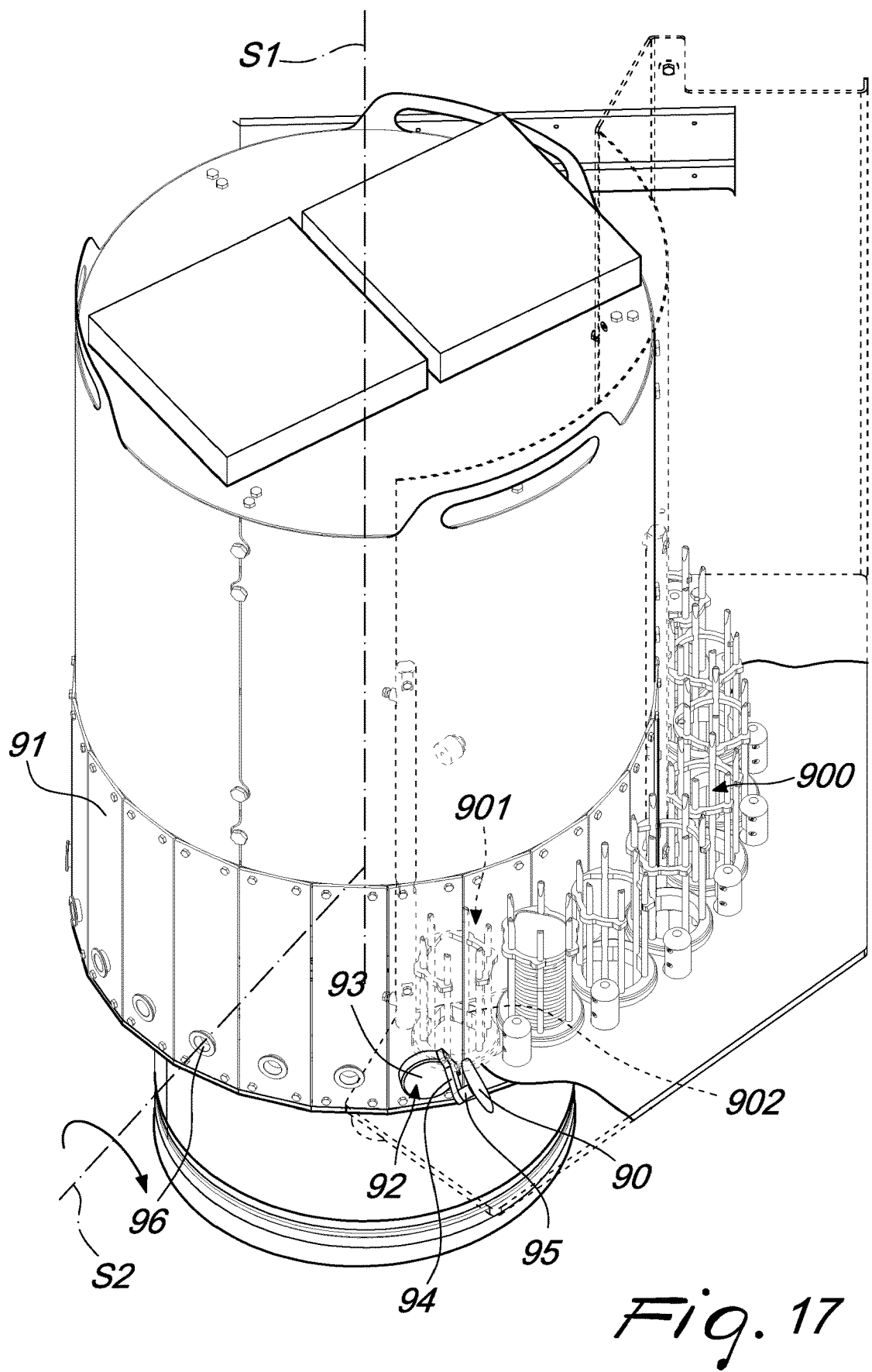
FIG. 17 is a perspective view of a station for feeding closing seals of the line in the previous figures.

With reference now to FIG. 17, this shows a station for feeding container closing seals 9, which is arranged downstream of the thermoforming station 5.

The station for feeding closing seals 9 comprises at least one fixed magazine of seals 901 and more preferably a plurality of magazines of seals 900, each one containing a plurality of closing seals 90, for example stacked, and provided with a respective outlet 902 from which the seals 90 can be taken individually. In the present description the seals 90 are also identified with "S" for short.

The magazines 900 can be rendered fixed, for example, by mounting them on a supporting surface which is in turn fixed in a cantilever fashion to an upright of the packaging line 1.

In the embodiment shown, the outlets 902 of the magazines of seals 900 are adapted to keep the seal 90 individually extractable from each one of them in a substantially horizontal position.

Since the seals 90 are preferably stacked in the respective magazines 900 along a substantially vertical direction extending away from the outlet 902, the downward-most seal of the stack, i.e. the one that is extracted from the respective outlet 902, is substantially parallel to the floor on which rests the seals feeding station 9 and/or the packaging line 1.

A carousel for feeding seals 91 is furthermore provided, which can rotate with respect to a first central rotation axis 51 and is provided with a plurality of pickers 92 which are radially spaced apart from the first rotation axis 51 and are arranged at regular angular distances about such axis 51. Only one of such pickers 92 is shown in FIG. 17.

The orthogonal projection of the pickers 92 on a plane perpendicular to the first rotation axis 51 defines a circumference, indicated here as the pitch circle of the carousel 51.

The pickers 92 can individually rotate about a second rotation axis S2 which is not parallel to the first rotation axis 51 of the carousel 91, but is oriented transversely to such first axis 51 and more preferably perpendicularly or radially to such first axis 51. In this manner, during the rotation of the carousel 91, at least one picker 92 is adapted to be rotated from a position for picking up the seal 90 from a magazine 901, in which the picker 92 is facing the outlet 902 of such magazine 901 in order to extract a respective seal 90 which is arranged parallel to the plane of rotation of the carousel 91, to a position for releasing the seal 90, in which the picker 92 is in an angularly spaced apart position about the second rotation axis S2 with respect to the pick-up position and in which the picker 92 releases the seal 90 that was previously taken from the outlet 902 of the magazine 901.

The pitch circle of the carousel for feeding seals 91 preferably intersects the pitch circle of another carousel present in the sealing station 7 in at least one point in which the pickers 92 are in the release position, so as to be able to release the seals 90 to the carousel of the sealing station 7.

Advantageously, each picker 92 is defined by an L-shaped arm 94 which ends with a sucker 95 and is fixed on the peripheral region of a disk which is pivoted in a hole 96 along the perimeter of the carousel 91. Such disk is coupled to suitable rotation means, not shown, for example to a respective brushless motor which is connected to a controller which commands all the brushless motors of the pickers 92.

The controller is conveniently programmed to actuate the brushless motors so as to make each picker 92, and in particular the suckers 95, along an arc of the pitch circle of the carousel 91, describe a portion of a cycloid from the pick-up position of the seal 90 to the release position of that same seal 90. In particular, the outlet 902 of the respective magazine 901 is arranged at, or facing toward, a cusp of said cycloid, so that in the pick-up position of the seal 90 the picker 92 can extract a seal 90 from the outlet 902 at substantially nil instantaneous speed. The portion of cycloid described is substantially a semicycloid, i.e. the seal 90 is subjected to a rotation of 180 degrees about the axis S2 by the picker 92 so as to be released to the sealing station 7 in a horizontal position and overturned with respect to the position that the seal 90 had in the magazine 901.

Advantageously, the magazines 900 are mutually angularly spaced apart according to angles identical to the angular distance of the pickers 92 along the pitch circle of the carousel 91 so that a plurality of pickers 92 can be located simultaneously in the pick-up position under a corresponding magazine and thus a plurality of seals 90 can be picked up simultaneously during the rotation of the carousel 91.

The means for rotating the pickers 92 are therefore configured to make a number of pickers 92 corresponding to the number of magazines 900 of the station for feeding seals 9 simultaneously describe a semicycloid so that the respective cusps of the semicycloids described will be located at, or facing, the respective outlets 902 of the magazines 900.

During the continuous rotation of the carousel for feeding seals 91 about the first axis S1, a set of adjacent pickers 92 are located with the sucker 95 directed upward and these pick up a respective seal 90 from the outlet 902 of a respective fixed magazine.

Following a command of the controller, each one of these pickers 92 rotates about the second axis S2, without the carousel 91 stopping, and the suckers 95 therefore describe a semicycloid path until they are brought to an angle of 180 degrees away from that of the pick-up position and the rotation of the picker about the second axis S2 is stopped, while the carousel 91 continues rotating about the first axis S1.

In this condition the seals 90 picked up are now hung from the suckers 95 and can be released to the adjacent carousel of the sealing station 7, the rotation of which is obviously synchronized with that of the carousel for feeding seals 91. The release can occur by pneumatically removing the partial vacuum between the sucker 95 and the seal 90, in a way that is known per se.

Downstream of the thermoforming station, the containers C (which are still empty) are fed to the carousel filling station 6 where they are filled with loose material, preferably edible material of the type mentioned above. No further details will be given of the characteristics of the filling station 6, since it is simply a continuously-rotating filling carousel and it is connected to at least one reservoir of edible material. The station is conventional per se but modified so as to support and fill the specific containers C formed by the thermoforming station 5.

Downstream of the filling station 6, the containers C (now containing the loose material) are conveyed toward the sealing station 7, to which the seals (S or 90) are also conveyed from the station for feeding closing seals 9 which has already been described.

Figure 18:
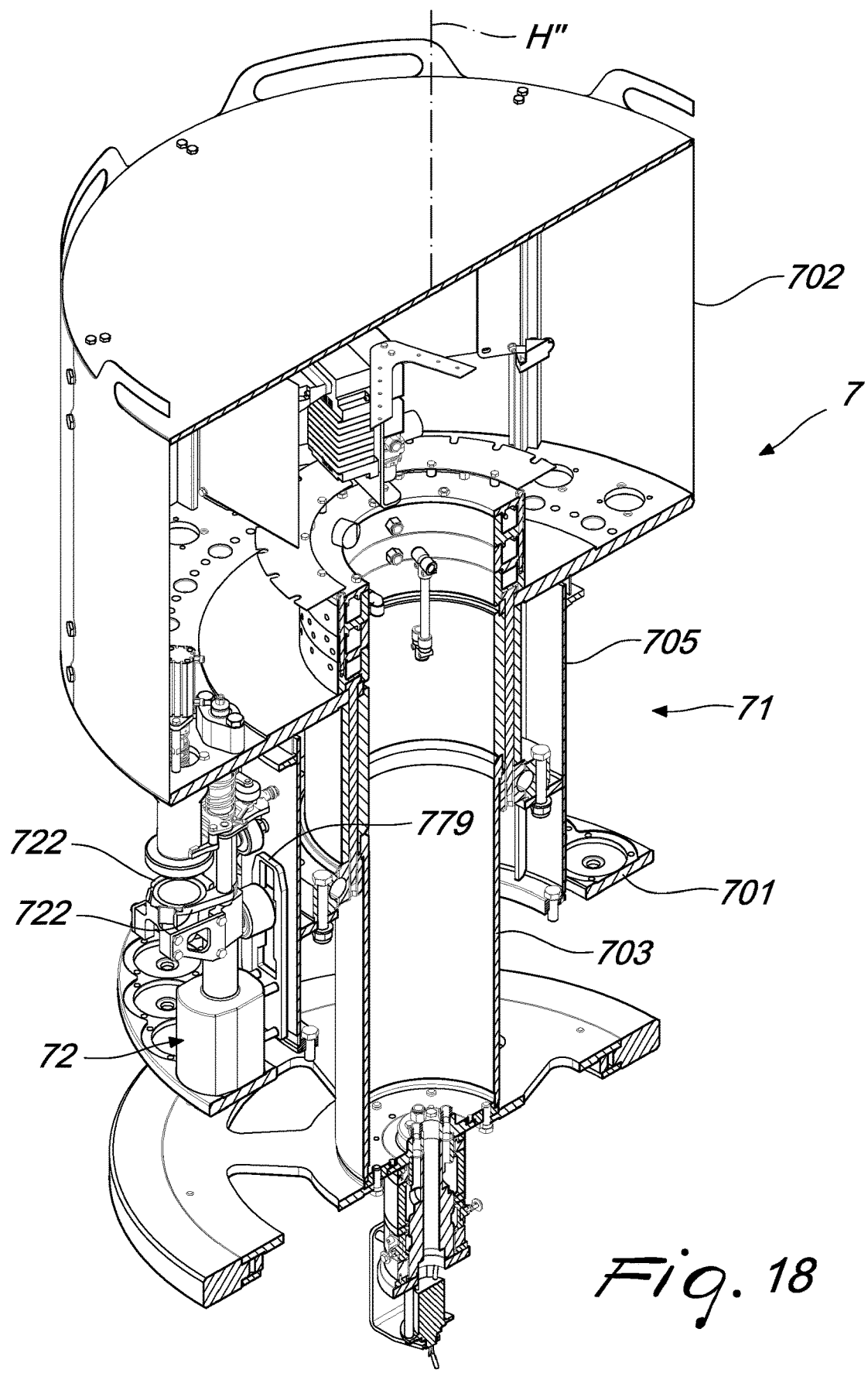
FIG. 18 is a cross-sectional perspective view of a sealing station of the line in the previous figures.
Figure 19:
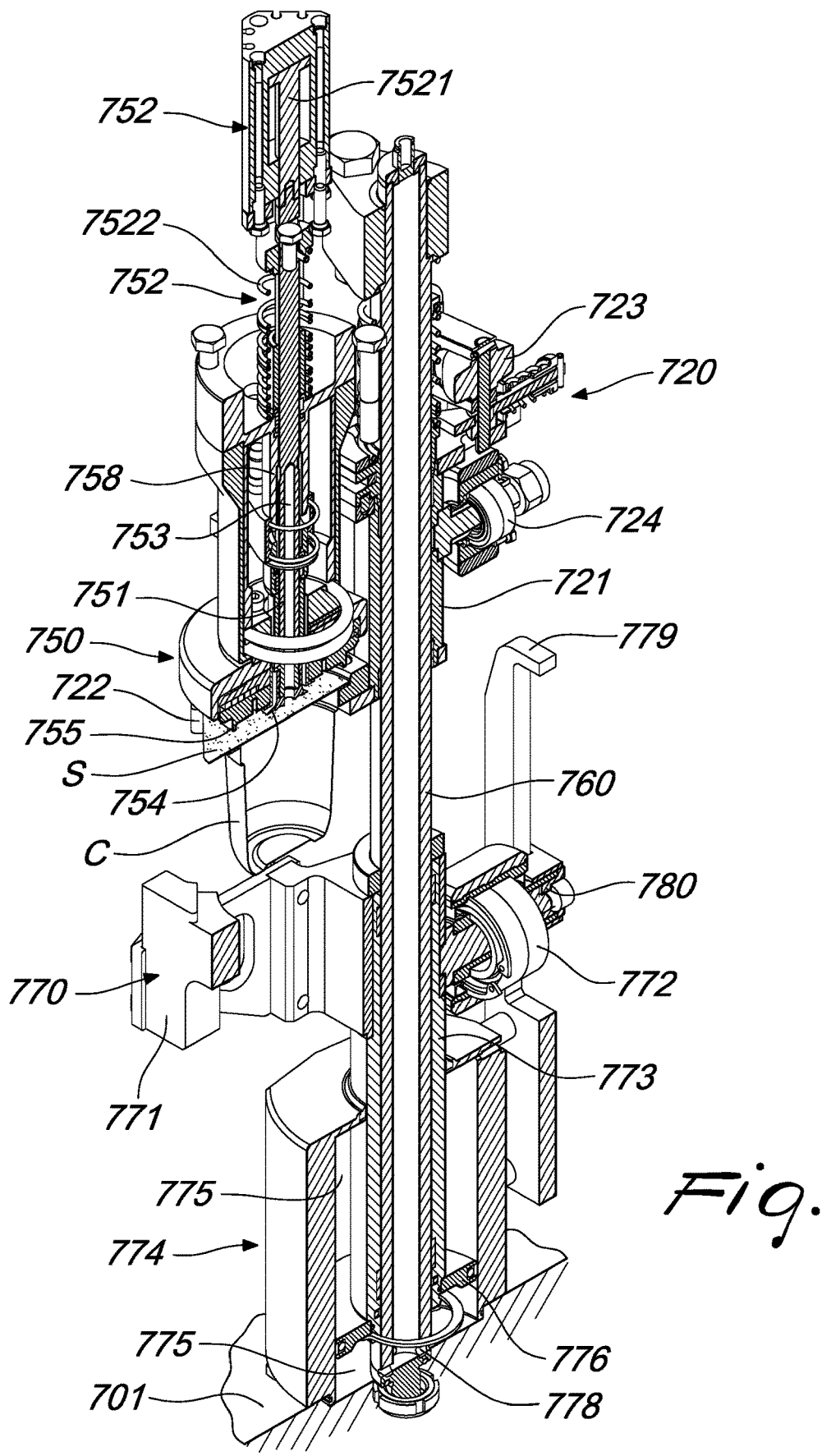
FIG. 19 is a cross-sectional view of a sealing head of the station of the previous figure.
Figure 20:
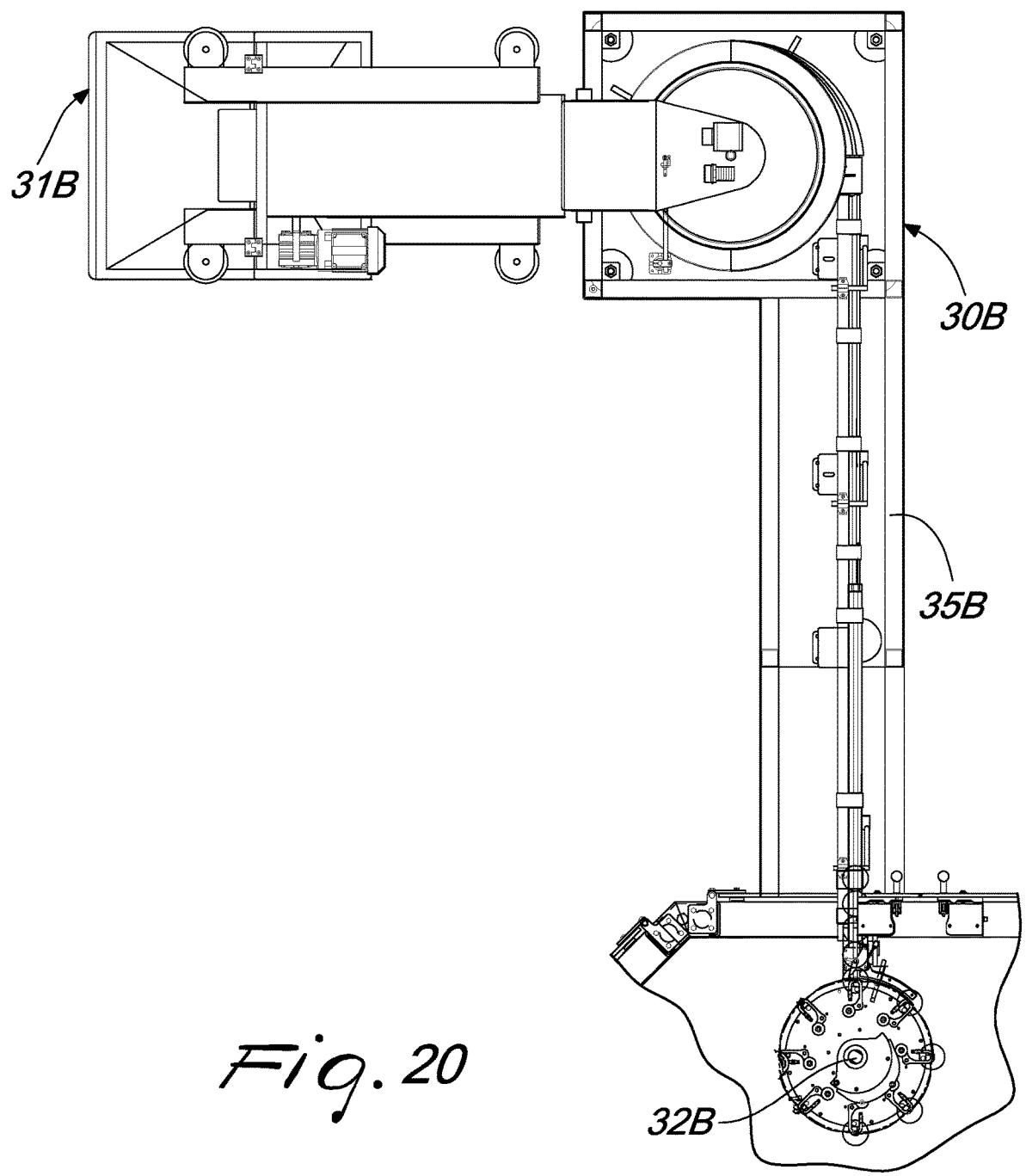
FIG. 20 is a plan view of a variation of the feeding station.

The sealing station 7 comprises a sealing carousel 71, which can rotate continuously about a central axis H" and which has a plurality of sealing heads 72 that are radially spaced apart from the central axis H". For the sake of simplicity, FIG. 18 shows only one sealing head 72.

During the continuous rotation of the sealing carousel 71 about the central axis H", each sealing head 72 is adapted to:

receive at least one container C to be sealed at a first, input, peripheral region 73, which is outside the sealing carousel 71;

receive at least one closing seal S at a second, input, peripheral region 74, which is outside the sealing carousel 71 and angularly spaced apart from the first peripheral region 73 with respect to the central axis H";

hold the closing seal S and the container C during the rotation of the sealing carousel 71 and stably couple them together;

release the container C complete with closing seal S thus provided to a third, output, peripheral region 75, which is outside the sealing carousel 71 and angularly spaced apart from the first and from the second region 73, 74 with respect to the central axis H".

In the first peripheral region 73 there can be an input star conveyor 83 which is adapted to feed containers C to the sealing carousel 71, and in the second peripheral region 74 there can be the carousel for feeding closing seals 91 which is adapted at least to continuously feed closing seals S to the sealing carousel 71, while in the third peripheral region 75 there can be an output star conveyor 84.

With reference to the direction of rotation of the sealing carousel 71 in operation, the first peripheral region 73 is preferably downstream of the second peripheral region 74.

The sealing carousel 71, in particular, can comprise a lower support ring 701, which is connected to the sealing heads 72, an upper chamber 702 which is connected to the ring 701 and to the central hub 703, and a fixed partition 705 for supporting the radial cams (not shown) for moving the components of the sealing heads 72.

The continuous rotation of the sealing carousel 71 about the central axis H" can be obtained, for example, by way of a direct-drive motor on the hub 703 of the carousel 71 or a motor connected to such hub by way of a transmission.

Each sealing head 72 can comprise an assembly for gripping and positioning 720, an assembly for picking up and sealing 750 and an abutment assembly 770.

The assembly for gripping and positioning 720 is configured at least to support and move, at various moments during operation, the container C and the closing seal S or 90 which arrive from the respective first and second region 73 and 74.

The assembly for picking up and sealing 750 is designed at least to pick up the closing seal S or 90 and to perform the operation of mutually stably coupling this seal and the container C. To this end, the assembly for picking up and sealing 750 is equipped at least with:

a pickup piston 751;

means for moving the piston 752;

means for activating the piston 753;

means for sealing 755.

The means for moving the piston 752 and the means for activating the piston 753 are preferably pneumatic. The piston 751 comprises a head with a sucker gripping device 754 and is adapted to pick up and retain the closing seal S, so that the container C can be moved along its vertical axis for the subsequent coupling action performed by the sealing means 755.

The abutment assembly 770 is designed at least to cooperate with the above assembly for picking up and sealing 750 in order to act as an abutment during the operation of mutual coupling and fixing between the closing seal S and the container C.

Optionally the abutment assembly 770 is designed also, or only, to support a closing seal S (which is then picked up by the piston 751) and/or a container C.

In such coupling operation, the peripheral edges of the seal S and of the container C are pressed against each other and, to this end, they are interposed between the abutment assembly 770 and the sealing means 755.

Each sealing head 72 is associated with a dedicated upright column 760 on which all or some of its components move and/or are supported. The upright column 760 is fixed on the ring 701 and extends vertically with its axis parallel to the rotation axis H" of the sealing carousel 71.

Descending into more detail about the embodiment shown, each assembly for gripping and positioning 720 can move slideably on the respective column 760 and to this end comprises a guide sleeve 721 that can slide on the column 760.

The assembly for gripping and positioning 720 in the preferred embodiment shown comprises, furthermore, mutually opposing pincers 722, which are substantially arc-shaped, and a first cam-following roller 723 for moving the pincers which, in the rotary movement of the sealing station 72 owing to the rotation of the sealing carousel 71, cooperates with a dedicated fixed cam (not shown) which determines the movement of the pincers 722 between two limit positions: a resting position, in which the pincers 722 are close together, and a release position, in which the pincers 722 are apart.

The pincers 722 can thus translate parallel to the column 760 by virtue of a second cam-following roller 724 which is connected to the sleeve 721 and cooperates, during the rotary movement of the sealing carousel 71, with a dedicated fixed cam (not shown).

The underlying abutment assembly 770 comprises a contoured support 771 and a dedicated sleeve 773 that can slide on the column 760; to this end the sleeve 773 is connected to a respective cam-following roller 772 which cooperates in the rotary movement of the station 72 on the sealing carousel 71, with a dedicated fixed cam (not shown).

Working against the cam-following roller 772 on the sleeve 773 is an actuator, preferably pneumatic, 774 which is fitted coaxially with the column 760 and which comprises a variable-volume chamber 775 in which a hermetic partition 776 is moved under the pressure of compressed air fed to the chamber by virtue of the openings 778. In operation, the cam (not shown) moves the cam-following roller 772 downward, contrasting the opposite thrust imparted by the partition 776 and in this way maintaining a condition of constant gripping contact between the roller 772 and the corresponding cam. The sleeve 773, and therefore in the final analysis the contoured support 771, are moved vertically parallel to the column 760.

As an alternative to the hydraulic actuator 774, there can be a spring or other, equivalent solutions adapted to act against the roller 772.

Furthermore the hydraulic actuator 774 compresses the container C and the seal S when the two are rendered integral.

The cams (not shown) are fixed to the fixed external partition 705, which does not rotate together with the ring 701 of the sealing carousel 71.

The contoured support 771 and the pincers 722 have substantially complementary shapes so as to define, when they are close together, a substantially continuous resting surface on which both the closing seal S and, in a subsequent step, the container C rest peripherally.

Returning briefly to the abutment assembly 770, this further comprises an anti-rotation device, which in turn is provided with a guide 779 which can rotate together with the column 760 and is provided with an oblong slot, which is parallel to the column 760 and in which a runner 780 slides which is integral with the sleeve 773.

Turning now to describe the assembly for picking up and sealing 750, in this we have the pickup piston 751 which moves in a coaxial cylindrical guide 758, between a retracted condition and an extended condition, i.e. for picking up, in which it protrudes in the direction of the abutment assembly 770 in order to retrieve the closing seal S or 90.

The displacement of the piston 751 between the two conditions occurs by virtue of movement means 752 which are preferably pneumatic: in this embodiment the movement means comprise a pneumatic actuator 7521 and a contrasting spring 7522 which act on and against the piston 751.

The activation means 753 of the piston are designed to activate the head with a sucker gripping device 754 in order to retrieve the closing seal S from the pincers 722. If the activation means 753 of the piston are pneumatic, the body of the piston 751 is provided with a passage channel connected to the sucker 754 in order to generate the partial vacuum that makes it possible to retain the closing seal S.

With regard to the means for sealing 755, these can vary according to requirements and to the type of sealing that it is intended to provide between the closing seal S and the container C.

In the preferred solution, the sealing means 755 comprise a peripheral heating lip which protrudes in the direction of the abutment assembly 770 and is designed to come into contact with the edges of the closing seal S in order to stably couple it to the container C.

With regard to the closing seal S, in the preferred embodiment, this is conventional and it comprises a flexible sheet (mono- or multilayer) which is provided with a heat-sealable film on the face directed toward the container C. For example, the film could be made with a layer of adhesive that can be thermally activated and/or with an adapted thermoplastic material. Both the form and the implementation of the closing seal S can vary according to the applications and the requirements.

Turning now to describe the operation of the sealing station 7 during the continuous rotation of the sealing carousel 71, referring, for the sake of simplicity, to a single sealing head, the closing seal S is first fed to the head 72, for example by way of the station 9.

The closing seal S or 90 initially rests only on a fixed curved surface interposed between the pincers 722, while the pincers 722 are in the open condition in order to facilitate the step of radial insertion of the closing seal S between them. In this step the contoured support 771 can be positioned close to the pincers, or, in an alternative embodiment, it can be in a lowered position.

At a later time, the pincers 722 are closed and optionally the contoured support 771 performs a translational motion toward them. The closing seal S or 90 rests peripherally both on the pincers 722 and on the contoured support 771, so as to be stable for the subsequent pick-up step.

In such pick-up step the sucker gripping device 754 of the piston 751 is made to descend until it comes into contact with the closing seal S. Substantially simultaneously, the means for activating the piston 753 are actuated, thus ensuring that the sucker gripping device 754 is correctly coupled to the closing seal S.

At a later time the piston 751 is made to go back up and it is brought to the condition in which it is spaced apart from the contoured support 771, in so doing moving the closing seal S away as well. Substantially simultaneously, the abutment assembly 770 performs a translational motion away from the assembly for picking up and sealing 750 and the pincers 722 are opened. In this manner, sufficient space is created to position the container C, which is fed radially from the star conveyor 83.

Subsequently, the pincers 722 close, thus supporting the container C, and they are moved toward the assembly for picking up and sealing 750, as a consequence moving the container C toward the closing seal S hung from the sucker 754, and preferably bringing them into contact.

At a later time the abutment assembly 770 is moved toward the assembly for picking up and sealing 750, thus compressing the peripheral edges of the closing seal S and of the mouth of the container C against the means for sealing 755.

In this condition the means for sealing 755 are activated, thus effecting the sealing of the container C with the closing seal S.

When the container C thus sealed reaches the third region 75, it is then unloaded by the station 7, for example toward an output star conveyor 84 from which it can be unloaded further, for example toward a conveyor belt.

The variation in FIGS. 20-23 shows a variation of the assembly (and therefore of the FFS packaging line) of the disclosure.

In this variation, the feeding station 3 and the magazines 4 described and shown earlier in FIG. 1 are substituted by a feeding station 3B that comprises:

a loose blank magazine 31B;
a centrifugal force selector 30B;
a feeding star conveyor 32B.

The loose blank magazine 31B is designed to contain a plurality of plastic sheet-like blanks G, for example in the form of a disk or the like, as described previously.

The loose blank magazine 31B can be static or dynamic: in the first case it comprises a simple accommodation chamber in which a plurality of blanks G are accumulated at random, while in the second case it comprises a conveyor belt on which the blanks G are transported.

The loose blank magazine 31B comprises a loading system that functionally connects it to the centrifugal force selector 30B, which is arranged downstream; in the embodiment shown, the loading system comprises a conveyor belt 33B which is designed to pick up the blanks G and to convey them to the centrifugal force selector 30B.

Preferably the conveyor belt 33B is on an inclined ramp, so that the blanks are taken at a lower height and unloaded at an upper height.

The centrifugal force selector 30B comprises a motorized ring drum 34B, which can rotate about a first axis Y and is substantially vertical when the machine is put into operation.

The drum 34B comprises shell walls that terminate at the free edge with a flat seat 37B which extends in a ring, the function of which will shortly be made clear.

Figure 21:
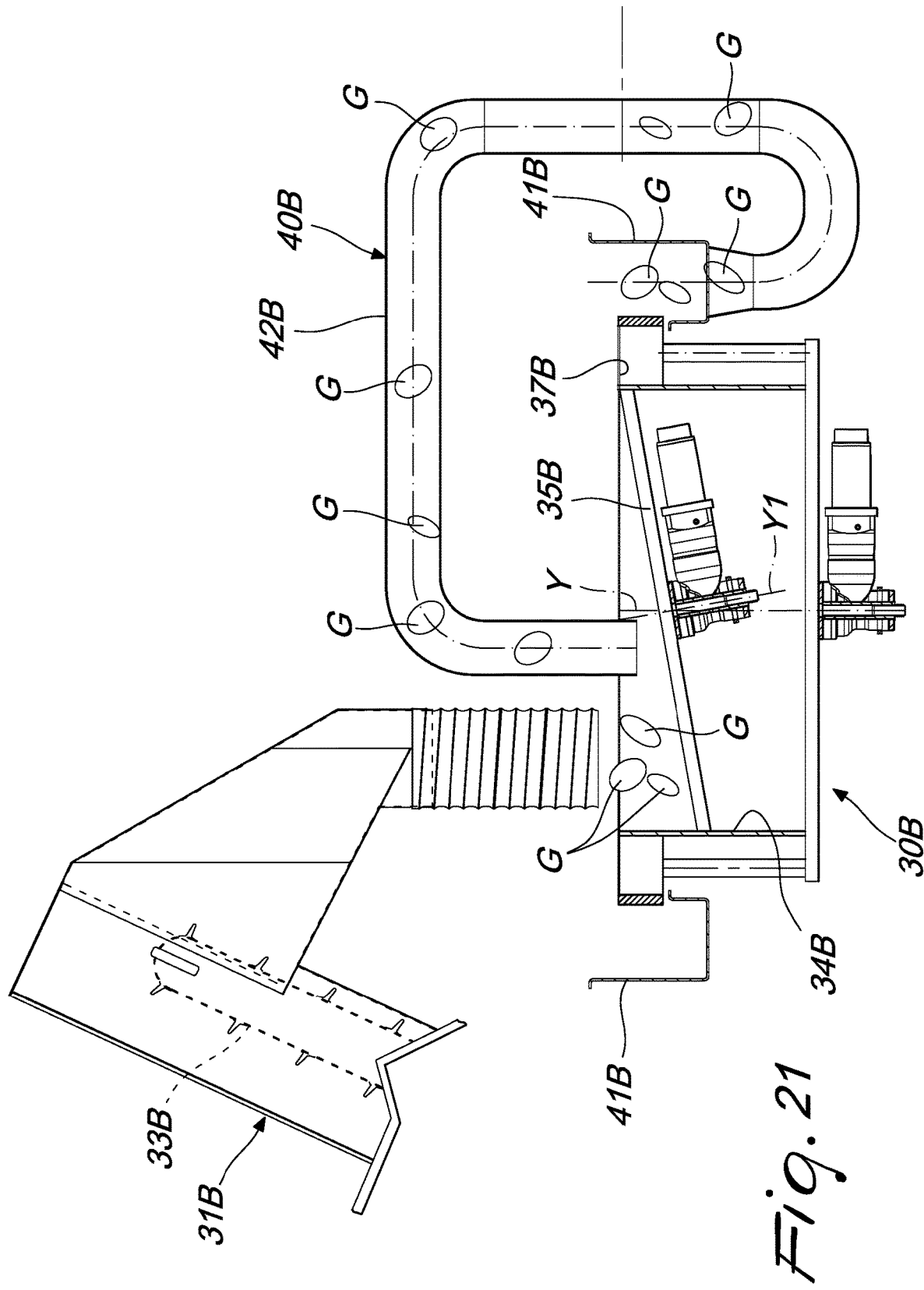
FIG. 21 is a cross-sectional view of a centrifugal selector in the station in FIG. 20.

Accommodated inside the drum 34B is a motorized selector disk 35B that can rotate about a dedicated axis Y1 which is inclined with respect to the Y axis; the drum 34B and the selector disk 35B are mutually concentric and inclined, as shown in FIG. 21.

The flat seat 37B is delimited externally, along a circular arc, by a rim 38B, which is fixed with respect to the seat 37B proper.

The rim 38B has an axial extension (parallel to the Y axis) that is substantially equal to or slightly less than the thickness (the smaller dimension) of a blank G.

Figure 22:
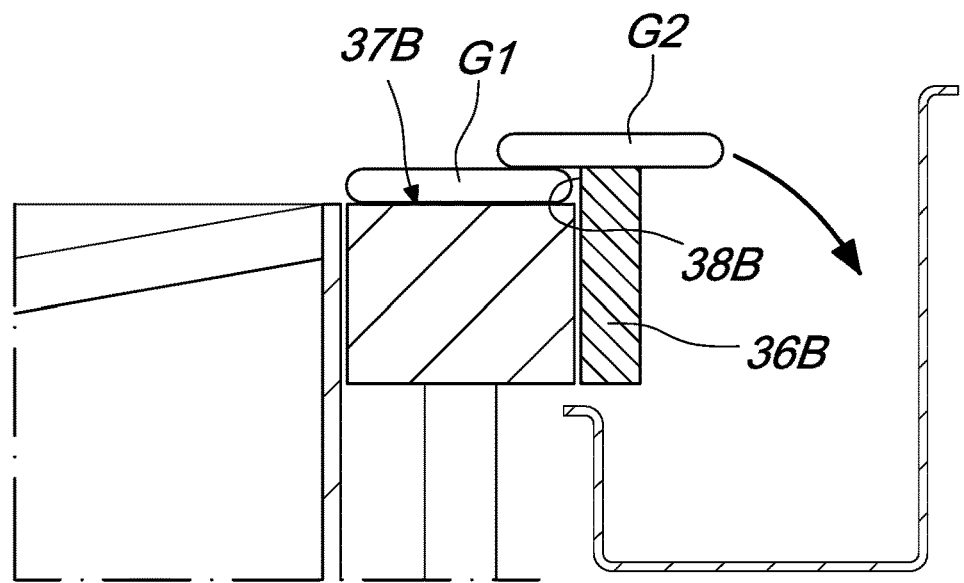
FIGS. 22 and 23 are cross-sectional views of a detail of the centrifugal selector in FIG. 21 in two different active positions.
Figure 23:
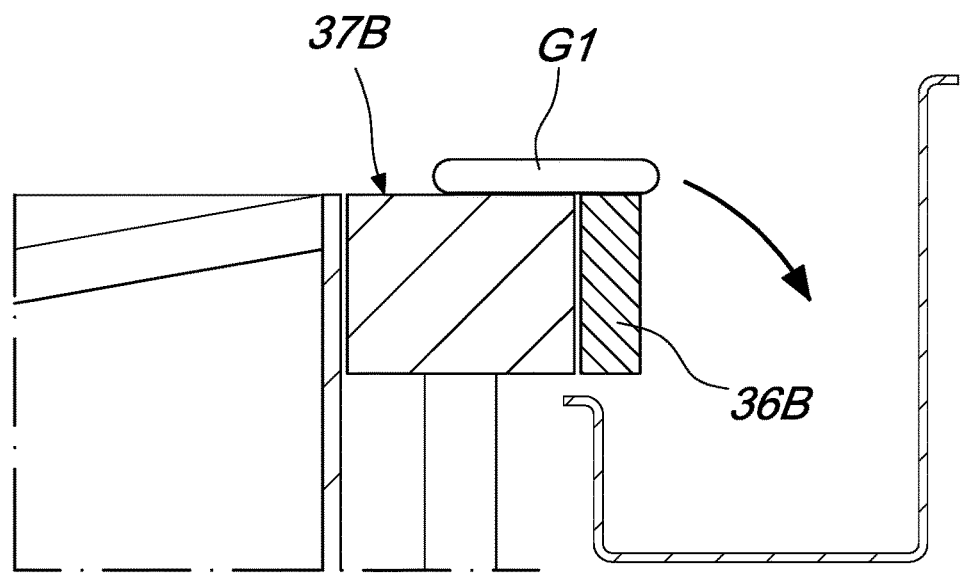

The axial rim 38A extends circumferentially about part of the flat seat 37A, leaving free at least one release point or region in which the rim 38A is absent: FIGS. 22 and 23 show two different cross-sections that are angularly spaced apart with respect to the Y axis.

In FIG. 22 the rim 38B is present, while in FIG. 23 the rim 38B is absent. It is noted that the term "rim" means the part of the (fixed) support 36B that extends above the height of the adjacent (movable) flat seat 37B to define, in fact, a kind of abutment for a blank G1 that is on the flat seat 37B proper.

As can be seen, FIG. 23 shows in particular the cross-section at the release region, from which a blank G1 of the sheet-like blanks G is unloaded and sent to the star conveyor 32B or, as in the solution shown, to a conveyor belt 39B which connects the centrifugal force selector 30B to the star conveyor 32B.

By contrast, at a different circular arc from the one in the above mentioned release region, the rim 38B is present, as shown in FIG. 22: in fact, where two blanks G1 and G2 are overlapping, the one arranged on top (G2), since it cannot rest on the rim 38B, is pushed by centrifugal force and travels radially until it falls into the collection ring 41B.

It is noted that the drum 34B and the disk 35B are mutually arranged so that the flat seat 37B is adjacent to the upper surface of the disk 35B, so that a blank G can pass from the latter to the former at a circular arc where the two are located substantially at the same height.

The centrifugal force selector 30B also comprises a system 40B for recirculating discarded blanks, which comprises the same collection ring 41B and a reintroduction conduit 42B which opens onto the collection ring 41B and comes out at the disk 35B.

Operation of the feeding station 3B is the following: the loose blanks G are taken from the magazine by way of the belt 33B and allowed to fall onto the disk 35B.

The blanks G are then moved on the surface of the disk 35B, which is rotating by way of centrifugal force, going on to be shifted to a peripheral position on that disk 35B.

When a portion of the surface of the disk 35B, in rotation, is directed toward the flat seat 37B, the blanks that are in such portion are moved by virtue of the centrifugal force on the flat seat 37B proper, where they come into abutment against the abutment 38B.

When two or more overlapping blanks G1 and G2 are located on the disk 35B, the ones resting on top of the first one are ejected by centrifugal force into the collection ring 41B, as described above, and from there they are fed once again to the disk 35B by virtue of the conduit 42B (in which a source of compressed air—or equivalent—acts to move the blanks).

The individual blanks G that remain resting on the flat seat 37B follow the rotation of the latter, remaining resting on the rim 38B until this is interrupted at the point of release of the blanks G.

From this release point, the blank G is then unloaded onto the conveyor belt 39B which transfers it to the star conveyor 32B.

The star conveyor 32B rotates with an angular speed substantially equal to that of the heating carousel 41 which has already been described, thus allowing the supply of the blank to the carousel 41 proper.

The work cycle, the assembly and the system then proceed as described earlier and therefore we will not explain these aspects further. From the foregoing description it seems clear that the method of manufacturing containers by thermoforming followed in the disclosure comprises the steps of:

a. taking at least one sheet-like blank from a magazine 2 in which multiple blanks are aligned, preferably stacked and stationary;

b. accelerating the blank to a linear speed that is substantially equal to and concordant with a peripheral speed of a carousel of a heating station;

c. transferring the blank to heating heads which are mounted on the carousel of the heating station or to an optional intermediate transfer star conveyor, which then releases it to the carousel of the heating station;

d. heating the blank;

e. transferring the heated blank to a thermoforming station for the manufacture of the containers.

Returning now to the line 1 as a whole, the thermoforming station 5, the filling station 6 and the sealing station 7 also comprise respective carousels 51, 61, 71 on which respectively at least thermoforming heads 52, filling heads and sealing heads 72 are provided.

Optionally, a first 81, a second 82 and a third 83 transfer star conveyor are also provided: the first transfer star conveyor 81 is interposed between the heating station 4 and the thermoforming station 5, the second transfer star conveyor 82 is interposed between the thermoforming station 5 and the filling station 6, while the third transfer star conveyor 83 is interposed between the filling station 6 and the sealing station 7.

In this way the carousels 41, 51, 61, 71 all rotate in accord with each other and synchronized with each other.

In practice it has been found that the assembly and therefore the line, according to the present disclosure, achieve the intended aim and advantages in that they make it possible to achieve the continuous production and the packaging of containers using thermoforming.

Another advantage of the disclosure is that it enables a high rate of productivity by virtue of the continuous operation of the line 1.

Furthermore, the line according to the disclosure, differently from linear machines, enables the format of the containers to be made to be changed without modifying the machine spacing.

Another advantage of the disclosure is that it avoids malfunctions.

The disclosure, thus conceived, is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102017000014643 (UA2017A000844) from which this application claims priority are incorporated herein by reference.

The invention claimed is:

1. An assembly for manufacturing containers by thermoforming, comprising:
   a magazine of thermoplastic blanks,
   a heating station for heating the blanks, the heating station comprising a heating carousel provided with a plurality of heating heads,
   a thermoforming station for thermoforming containers starting from said blanks,
   a feeding station for feeding the blanks comprising a closed-loop path and at least two conveyor elements which move, following each other, along said closed-loop path between a loading position, in which the conveyor element faces the magazine, and an unloading position, in which the conveyor element faces the heating station, in operating condition, the conveyor element in the unloading position moves with a substantially linear motion with a speed that is substantially equal to a peripheral speed of the heating carousel, wherein the heating carousel is configured to rotate continuously about a central axis, and wherein the closed-loop path of the feeding station lays on a plane that is perpendicular to said central axis.

2. The assembly according to claim 1, wherein the relative speed between the magazine and the conveyor element in the loading position is substantially nil.

3. The assembly according to claim 1, wherein the feeding station comprises a single kinematic chain for said conveyor elements, so that said conveyor elements are driven together in motion along said closed-loop path, and a base on which the closed-loop path is mounted so that it can oscillate.

4. The assembly according to claim 3, wherein the kinematic chain is moved by a chain motor and the base is moved by a respective base motor, the chain motors and the base motor being mutually synchronized in order to bring, in the operating condition, the speed of the conveyor element in the loading position substantially to zero and the speed of the conveyor element in the unloading position to a value that is substantially equal to a peripheral speed of the carousel of the heating station.

5. The assembly according to claim 1, wherein the feeding station comprises a separate kinematic chain for each conveyor element, so as to guide each conveyor element separately in motion along said closed-loop path.

6. The assembly according to claim 1, wherein the feeding station is a long stator linear motor comprising a number of transport rails along which said conveyor elements are slidable and along which a plurality of electrical driving coils are longitudinally arranged, said transport rails being arranged so as to form an oval track, said driving coils are adapted to interact with excitation magnets suitably arranged on said conveyor elements, the assembly comprising a controller adapted to individually control an electrical current of said driving coils for individually moving or stopping said conveyor elements.

7. A packaging line comprising:
a manufacturing assembly according to claim 1,
a station for filling the containers with loose material,
a station for sealing the filled containers.

8. The packaging line according to claim 7, wherein the thermoforming station, the filling station and the sealing station comprise respective carousels on the peripheral region of which there are respectively thermoforming heads, filling heads and sealing heads.

9. The packaging line according to claim 8, comprising a first transfer star conveyor, a second transfer star conveyor, and a third transfer star conveyor, wherein the first transfer star conveyor is interposed between the heating station and the thermoforming station, the second transfer star conveyor is interposed between the thermoforming station and the filling station, and the third transfer star conveyor is interposed between the filling station and the sealing station.

10. A method of manufacturing containers by thermoforming, including the following steps:
a. taking at least one blank from a magazine in which multiple blanks are aligned,
b. accelerating said at least one blank to a linear speed that is substantially equal to and concordant with a peripheral speed of a carousel of a heating station, moving the blank along a closed-loop path laying on a plane that is perpendicular to a central axis,
c. transferring said at least one blank to heating heads which are mounted on the carousel of the heating station or to an intermediate transfer star conveyor, which then releases said at least one blank to the carousel of the heating station, the carousel rotating continuously about the central axis,
d. heating said at least one blank, and
e. transferring said at least one heated blank to a thermoforming station for the manufacture of said containers.

* * * * *